(12) United States Patent
Fenton, Jr.

(10) Patent No.: US 6,523,673 B1
(45) Date of Patent: Feb. 25, 2003

(54) METHOD AND APPARATUS FOR REPLACING PALLET CARS ON A TRAVELING GRATE MACHINE

(75) Inventor: Edward A. Fenton, Jr., Wexford, PA (US)

(73) Assignee: Svedala Industries, Inc., Pittsburgh, PA (US)

( * ) Notice: Subject to any disclaimer, the term of this patent is extended or adjusted under 35 U.S.C. 154(b) by 212 days.

(21) Appl. No.: 09/718,683

(22) Filed: Nov. 22, 2000

Related U.S. Application Data
(60) Provisional application No. 60/167,343, filed on Nov. 24, 1999.

(51) Int. Cl.[7] .................. B65G 29/00; B65G 37/00; B65G 47/84
(52) U.S. Cl. ............... 198/465.1; 198/861.1; 198/795
(58) Field of Search .............. 198/861.1, 795, 198/867.13, 867.14, 465.1; 104/130.01, 130.05, 130.09, 130.08

(56) References Cited

U.S. PATENT DOCUMENTS

| | | | | |
|---|---|---|---|---|
| 1,656,909 A | * | 1/1928 | Dewey | 198/465.1 |
| 3,713,634 A | * | 1/1973 | Moller et al. | 266/179 |
| 3,848,726 A | * | 11/1974 | Wiemer | 198/795 |
| 3,863,755 A | * | 2/1975 | Hartwig | 198/525 |
| 4,127,381 A | * | 11/1978 | Wiemer | 266/180 |
| 4,261,459 A | * | 4/1981 | Latowski et al. | 198/795 |
| 5,220,996 A | * | 6/1993 | Noestheden | 198/465.1 |
| 6,415,906 B2 | * | 7/2002 | Bethke et al. | 198/343.1 |

* cited by examiner

Primary Examiner—Christopher P. Ellis
Assistant Examiner—Richard Ridley
(74) Attorney, Agent, or Firm—Webb Ziesenheim Logsdon Orkin & Hanson, P.C.

(57) ABSTRACT

An apparatus and method for changing pallet cars on-the-fly in a traveling grate machine which includes spaced-apart drive sprockets positioned at one end of intermediate curved end portions for engaging and driving the supporting rollers of the pallet cars and for causing movement of the pallet cars along the top and bottom strands of the machine. The apparatus for changing pallet cars includes first hinged sections of outer guide rails located at the drive sprockets adjacent to the bottom strand of guide rails. The first sections of hinged guide rails are moved from a locked position to an open position whereby in the open position a selected pallet car requiring replacement is removed from the drive sprocket means and outer guide rails as the drive sprocket continues to turn. Second hinged sections of outer guide rails arc provided at the top of the drive sprocket adjacent to the upper strand of guide rails. The second hinged sections of outer guide rails are selectively moved from a locked position to an open position whereby in the open position a replacement pallet car is inserted on the sprocket means and against the inner guide rails in a position previously occupied by the aforementioned first pallet car as the drive sprocket rotates. The second hinged sections of outer guide rails are then moved back into the locked position. The procedure is repeated as necessary to replace damaged or otherwise worn pallet cars requiring maintenance.

6 Claims, 22 Drawing Sheets

METHOD AND APPARATUS FOR REPLACING PALLET CARS ON A TRAVELING GRATE MACHINE

CROSS-REFERENCE TO RELATED APPLICATION

This application claims the benefit of provisional application Ser. No. 60/167,343 filed Nov. 24, 1999.

BACKGROUND OF THE INVENTION

1. Field of the Invention

The present invention relates generally to traveling grate machines for thermally treating particulate materials, such as, for example, iron ore or zinc ore pellets. More particularly, the present invention relates to apparatus and methods for removing and replacing selected pallet cars in a traveling grate machine "on-the-fly", that is, while the traveling grate machine is in operation.

2. Background of the Related Art

Traveling grate machines of the type shown in FIGS. 1–4, generally designated 2, have a plurality of pallet cars 4 which receive a burden 5, for example. iron ore from a feed means 9. The pallet cars travel on a horizontally extending, top strand 6 through an updraft drying zone 12, a downdraft preheating/drying zone 13 and, thence, to a high temperature firing zone 14 to thermally condition the particulate iron ore pellets in a desired manner. A first cooling zone 15 and a second cooling zone 16 in an updraft manner complete the thermal treatment of the particulate matter carried by the pallet cars 4. At the end of the upper strand 6, at the idler sprocket end 11, the heat-treated burden is dumped by gravity from the pallet cars which then travel in an upside-down, empty condition along a horizontally extending bottom strand 8 to return to the drive sprocket 10 end of the traveling grate machine 2. Due to the severe environment of the traveling grate machine, routine maintenance is required on the pallet cars 4. Currently, this maintenance is accomplished by first stopping the machine and removing and replacing the pallet car or cars needing maintenance. It is undesirable to stop the traveling grate machine for such maintenance requirements for several reasons. Stopping the machine modifies the thermal process causing degradation of the product quality. Because the process involves very high temperatures, pallet car components in a pallet change condition are subject to higher temperatures for a prolonged time period, for example, in the preheat and firing zones of the traveling grate machine, which results in a lower pallet car life. Finally, there is a loss of production output when the traveling grate machine is stopped for the purpose of pallet car changeover or replacement.

The present invention eliminates these problems enumerated above by providing an apparatus and method whereby pallet cars are changed on-the-fly, that is, without stopping the machine. Hence, the present invention provides for uniform quality of the thermally treated ore while increasing productivity of the machine and eliminating the problem of overheating of pallet cars heretofore required in prior art pallet changeover methods.

SUMMARY OF THE INVENTION

Briefly stated, the present invention is directed to an apparatus and method for changing pallet cars on-the-fly in a traveling grate machine. The pallet cars are of the type having supporting wheels thereon for travel on the traveling grate machine which includes spaced-apart outer and inner guide rails located at each side of the machine for guiding the wheels of the pallet cars along a top strand and, thence, to a bottom or return strand, and along intermediate curved end portions joining the top and bottom strands. Further, the traveling grate machine is of the type which includes drive sprocket means positioned at one of said intermediate curved end portions for engaging and driving rollers, adjacent to the wheels, carried by the pallet cars for causing movement of the pallet cars along the top and bottom strands of the machine.

The apparatus for changing the pallet cars comprises first hinged sections of outer guide rails located at the drive sprocket means adjacent to the bottom strand. A means for pivotally moving the first hinged sections of outer guide rails from a locked position to an open position is provided whereby in an open position a selected first pallet car may be removed from the drive sprocket means and inner guide rails. Also provided are laterally spaced-apart second hinged sections of outer guide rails located at the drive sprocket means adjacent to the upper strand. Means for pivotally moving the second hinged sections of outer guide rails from a locked position to an open position is also provided, whereby in an open position a replacement pallet car may be inserted on the sprocket means and against the inner guide rails in a position previously occupied by said selected first pallet while the sprocket means rotates. The apparatus further preferably includes a movable shuttle car for receiving and supporting the selected first pallet car from the first hinged sections of outer guide rails and for transporting the pallet car so removed to a remote location for pickup by a crane. Also provided is a pallet car insertion means comprising a structural frame pivotally mounted to a separate structure located adjacent to the drive sprocket means for supporting and lifting a replacement pallet car into a position whereby the replacement pallet car may be inserted on the drive sprocket means as the structural frame pivots to an uppermost position. The pallet car insertion means preferably includes means for electro-magnetically holding the replacement pallet car thereto as the structural frame pivots to an uppermost position.

The presently preferred method for changing pallet cars according to the present invention comprises the steps of: providing a first hinged section of outer guide rails located at the drive sprocket means adjacent to the bottom strand of the traveling grate machine; opening the first hinged section of guide rails; removing a first selected pallet car positioned at the first hinged section as the drive sprocket means rotates to provide an open space between a pair of adjacent pallet cars; closing said first hinged section of guide rails after said pallet car has been removed to permit an adjacent trailing car to ride therealong; providing a second hinged section of outer guide rails spaced from said first hinged section located at the drive sprocket means adjacent the upper strand of the machine; rotating the drive sprocket means to index the open space formerly occupied by the removed pallet car to a position adjacent said second hinged section of guide rails; opening the second hinged section; inserting a replacement pallet car into the space formerly occupied by the removed car; and closing the second hinged section of outer guide rails, whereby the pallet car replacement is accomplished without halting movement of the drive sprocket means.

DETAILED DESCRIPTION OF THE PREFERRED EMBODIMENT

Figure 3:
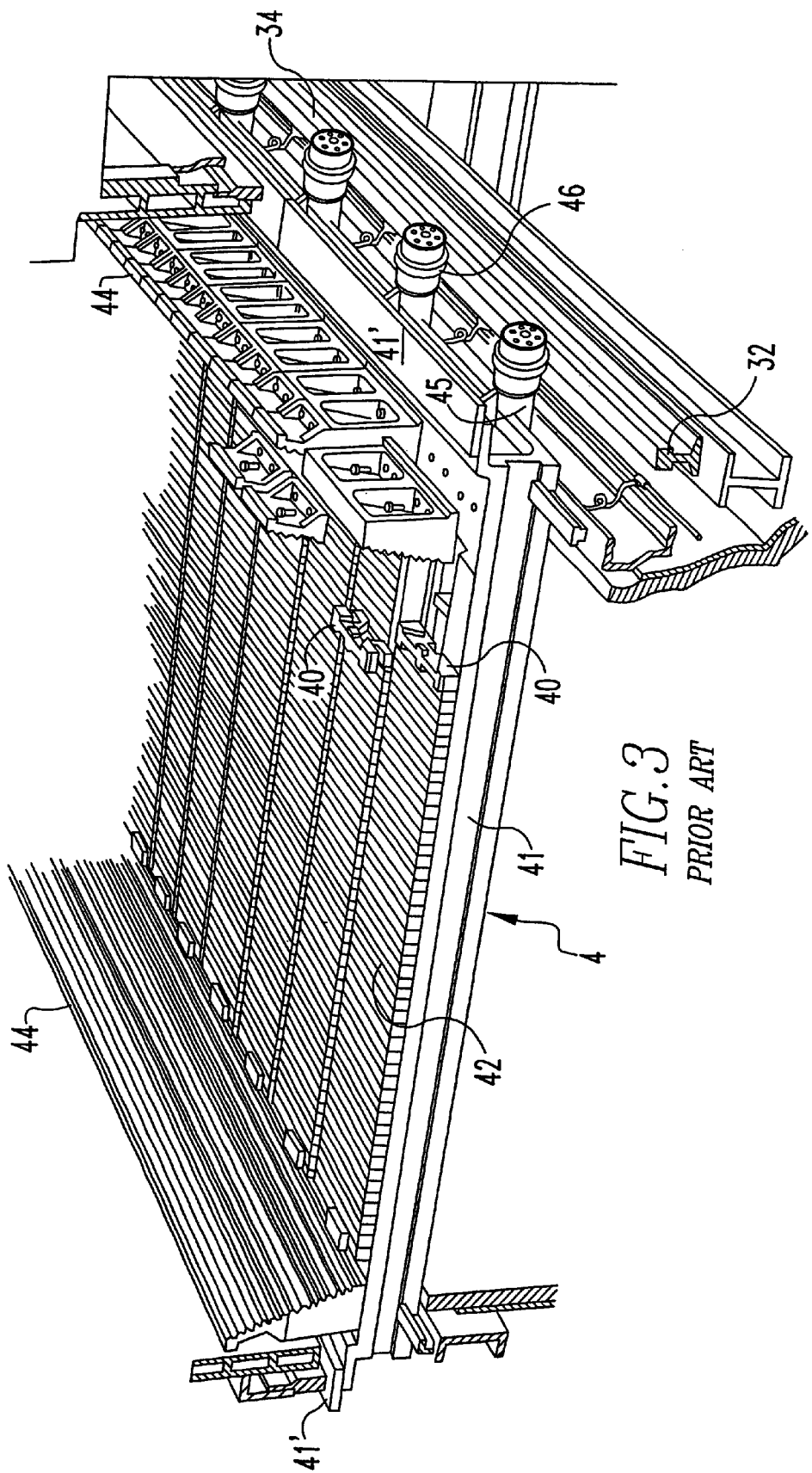
FIG. 3 is a fragmented, perspective view of a pallet car on a top strand of a traveling grate machine.
Figure 3A:
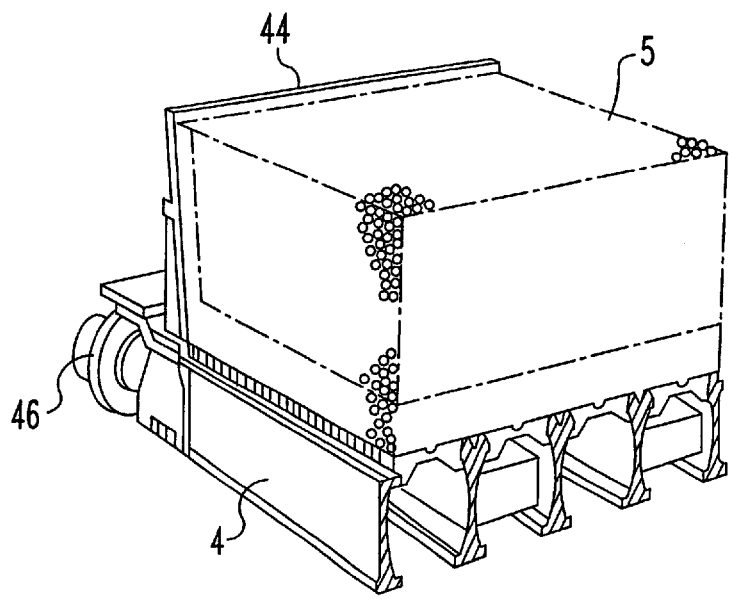
FIG. 3A is a partial, fragmentary perspective view of a pallet car showing a particulate burden thereon.
Figure 3B:
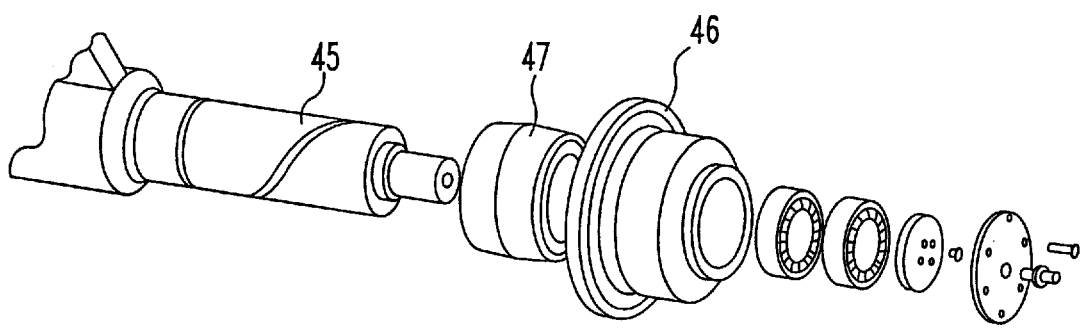

With reference to FIGS. 1–4, a conventional traveling grate machine 2 has material feed means in the form of hoppers 9 for feeding particulate material, such as iron ore pellets or zinc ore pellets, onto the moving pallet cars 4. The particulate material forms a burden 5 on the pallet cars 4, as depicted in FIG. 3A. The pallet cars 4 have a perforate floor 42 made up of individual grate bars 40 having spaces formed therein to permit the passage of air, either in a downward direction or in an upward direction. The air passes through the perforate floor 42 and through the particulate burden 5. The pallet cars 4 are made up of a frame 41 upon which the grate bars 40 are fitted. Side walls 44 are located at each transversely spaced side of the pallet cars 4 to prevent spillage of the particulate burden outwardly from the sides of the pallet cars. As depicted in FIG. 3, each pallet car has wheel shafts 45 extending outwardly on opposed sides therefrom and carrying pallet wheels 46 thereon. The pallet wheels 46 ride on laterally spaced-apart inner guide rails 34 along an upper or top strand 6 of the traveling grate machine so that the individual pallet cars are in an abutting relationship to form a continuous moving perforate floor 42 or hearth for the burden 5 to move through various zones 12–16 of the traveling grate machine as thermally treated air is directed through the burden 5 and perforate floor 42. In the case of iron ore, the ore burden 5 is loaded onto the moving pallet cars 4 beneath the feed hoppers 9 and enters the first chamber 12 whereupon the material is dried by way of an updraft flow of air. The material continues to be dried as it enters the second zone 13 where a downflow stream of air dries and then preheats the iron ore burden. The dried iron ore pellets then enter the firing zone 14 whereupon the pellets are hardened or partially sintered by the high temperature downflowing gases which pass through burners at the top of the zone. The fired particulate iron ore pellets then enter cooling zones 15 and 16 where the material is cooled by way of incoming air directed in an upflowing condition which passes through the perforate floor 42 of the pallet cars and, thence, passes through the fired iron ore pellets to cool the same. At the end of an upper strand 6, the pallet cars are directed downwardly in their travel around an idler sprocket 11 for dumping of their cooled iron ore pellets. The pallet cars then continue travel along a bottom strand or return strand 8 where the wheels 46 of the pallet cars rest upon laterally spaced-apart outer guide rails 32. The pallet cars are in an inverted, upside-down position as they travel along the bottom or return strand 8.

Figure 1:
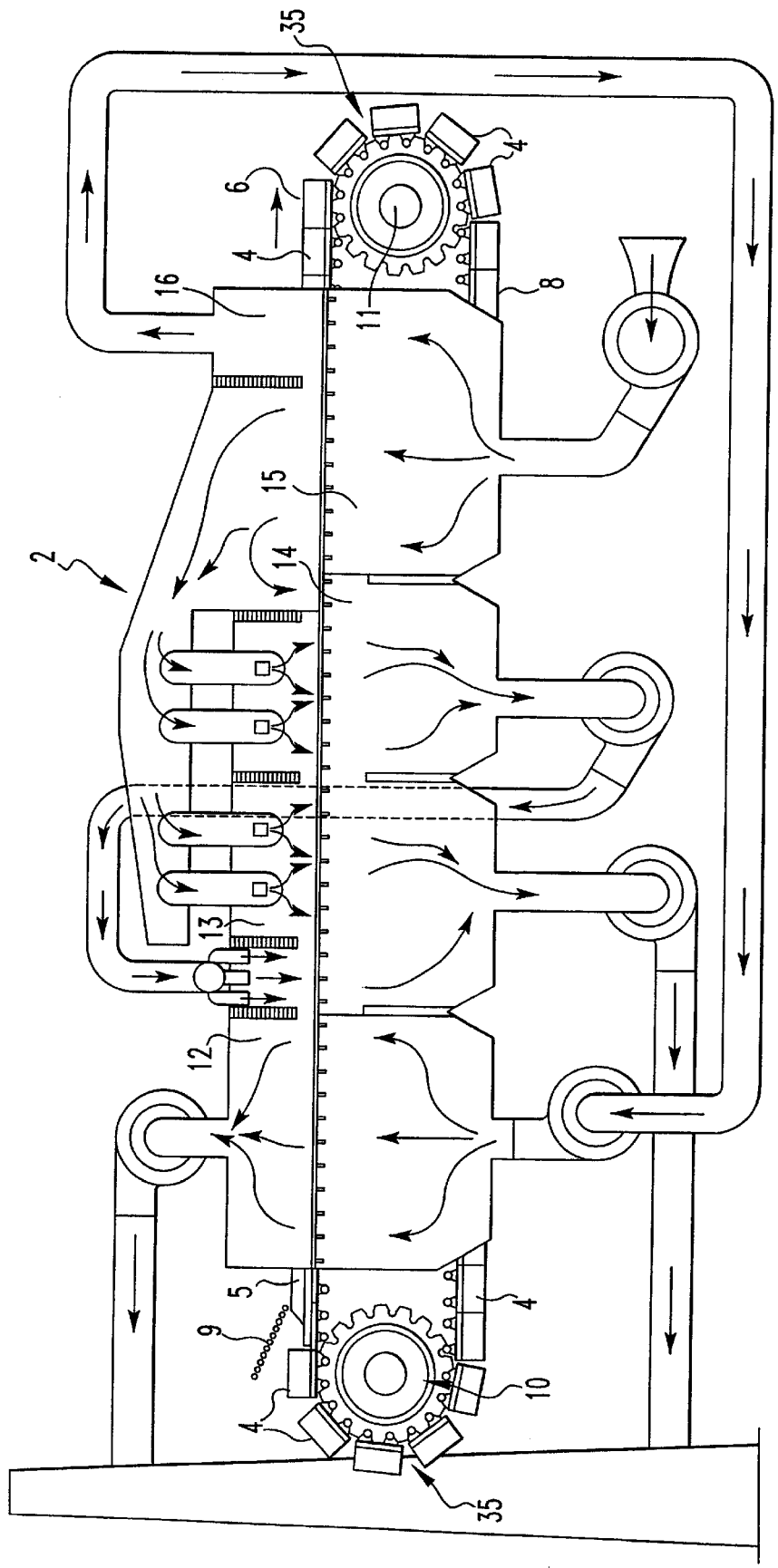
FIG. 1 is a schematic side elevation view of a conventional traveling grate machine.
Figure 2:
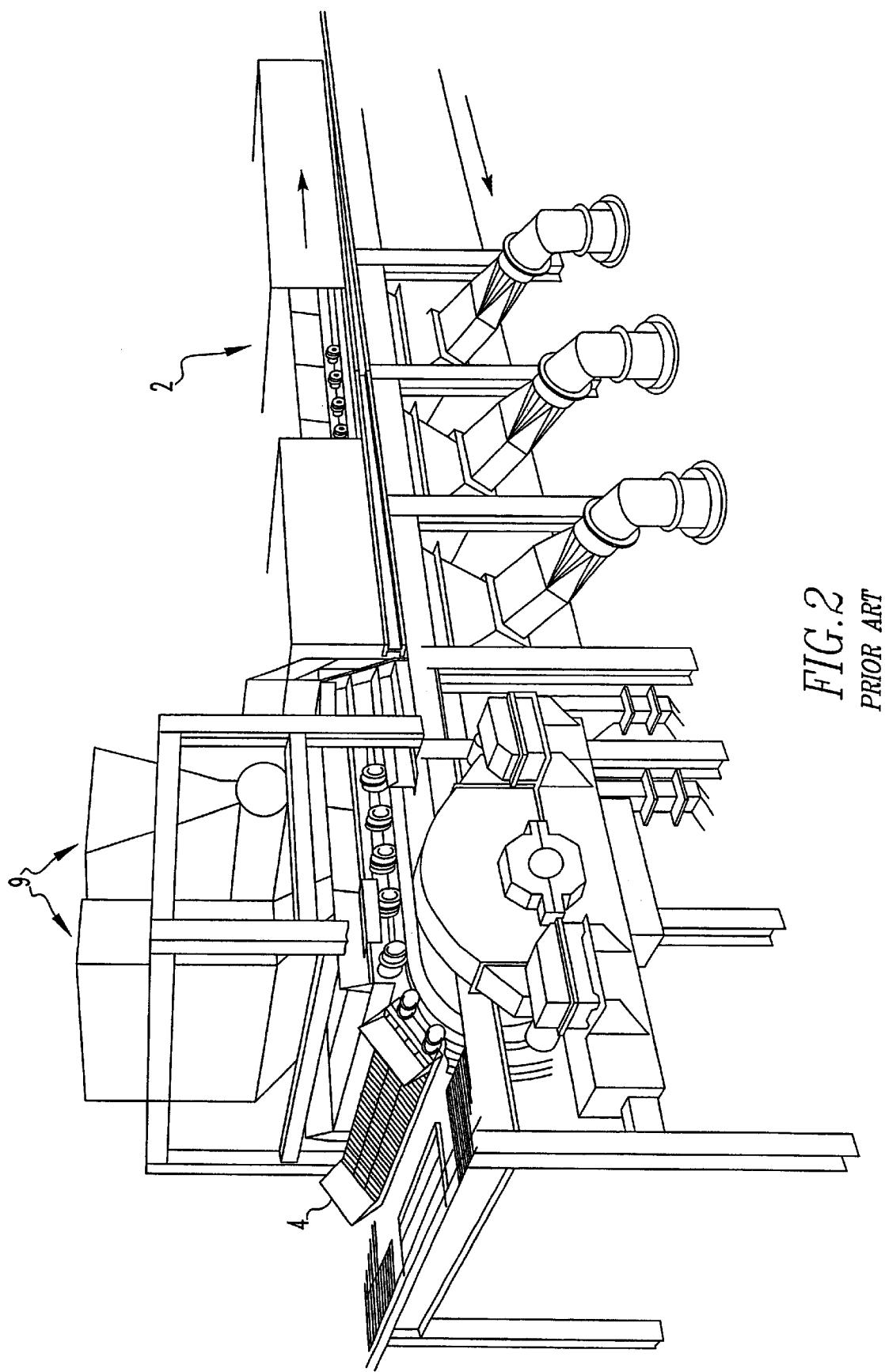
FIG. 2 is a partial perspective view of the feed end of a conventional iron ore sintering traveling grate machine.
Figure 4:
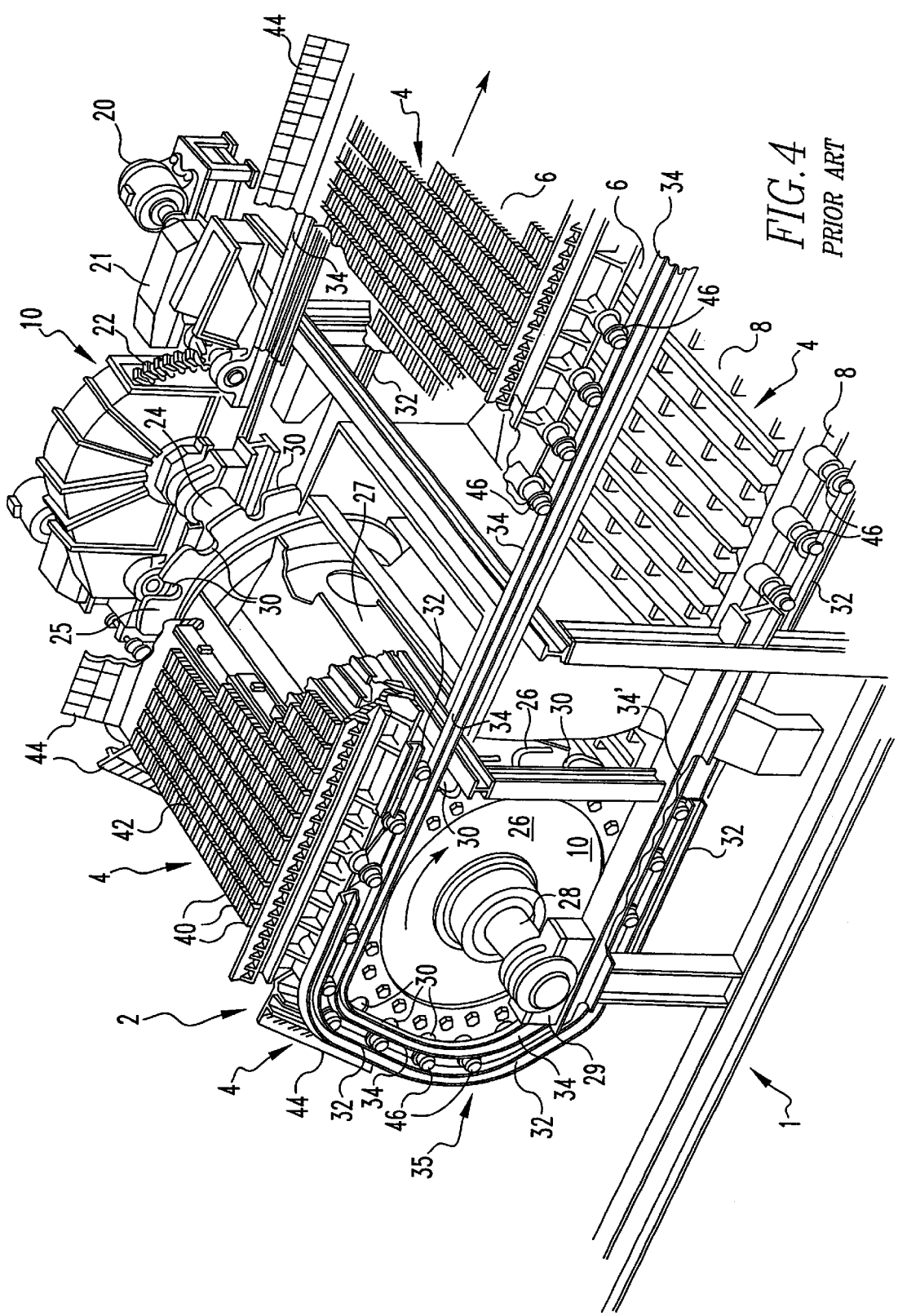
FIG. 4 is a partial fragmentary perspective view of a conventional traveling grate machine showing the drive sprocket means thereof.

As the pallet wheels 46 reach the end of the horizontal return strand 8, the pallet cars enter into an area where they are confined by the inner guide rails 34 which continue in spaced-apart relationship relative to the outer guide rails 32 around intermediate curved sections 35, 35' which join the outer and inner guide rails at the top strand 6, FIGS. 1 and 4. In this manner, the inner and outer guide rails 34 and 32 keep the pallet wheels confined as they move from the bottom strand to the top strand. As seen in FIG. 4, the outer and inner spaced-apart guide rails 32 and 34, respectively, guide the pallet wheels 46 and pallet cars 4 around the intermediate curved end portions 35, 35', joining the top and bottom strands 6 and 8, respectively. The outer guide rails 32 terminate at a downstream location from the intermediate curved section 35, since it is no longer needed, as it passes drive sprockets 25, 26 in that the pallets 4 are held in position along the inner guide rails 34 by gravitational force along the top strand 6. This is, likewise, true for the inner guide rails 34 which terminate in a similar position along the bottom strand 8 indicated by numeral 34' in FIG. 4.

As can be seen in FIG. 3, the pallet cars 4 carry a roller element 47 on each of the pallet shafts 45. The roller elements 47 are engaged by the sprocket teeth 30 on either side of the pallet cars as the pallet cars move around the intermediate curved end portions 35, 35'.

With reference to FIG. 4, the movement of the pallets 4 along the upper and lower strands 6 and 8, respectively, are powered by a drive train means comprising a drive motor 20 which is operatively coupled to a gear box 21 for engagement with a spur gear 22 which turns a drive shaft 24. First drive sprocket 25 is attached to the drive shaft 24 and second drive sprocket 26 is coupled to the first drive sprocket 25 by way of a torque tube 27. The second drive sprocket 26 has a shaft 28 mounted thereto in axial alignment with drive shaft 24. The shaft 28 is journaled for rotation within a bearing mount 29 attached to the frame structure 1 of the traveling grate machine 2.

The drive sprockets 25 and 26 have sprocket teeth 30 formed around the outer perimeters thereof to engage the roller elements 47 which are rotatably mounted on the wheel shafts 45 of the pallet cars 4. The motor drive system, including the spur gear and first and second sprockets 25, 26, is herein collectively referred to as a drive sprocket means 10 which is rotated by the drive motor 20 in a clockwise direction in the view shown in FIG. 4, as well as the remaining Figures. It will be understood that both the first and second drive sprockets 25 and 26 engage and move the pallet cars from the return or lower strand 8 around the intermediate curved end portion 35 of the guide rails to the top strand 6 by way of engagement of the sprocket teeth 30 with the rollers 47 of the pallet cars 4. In this manner, the pallet cars 4 are continually moved along the top and bottom strands through the traveling grate machine for thermal processing of particulate materials.

In order to replace a worn or otherwise damaged pallet car 4, reference will be made now to FIGS. 5–21 of the appended drawings.

Figure 5:
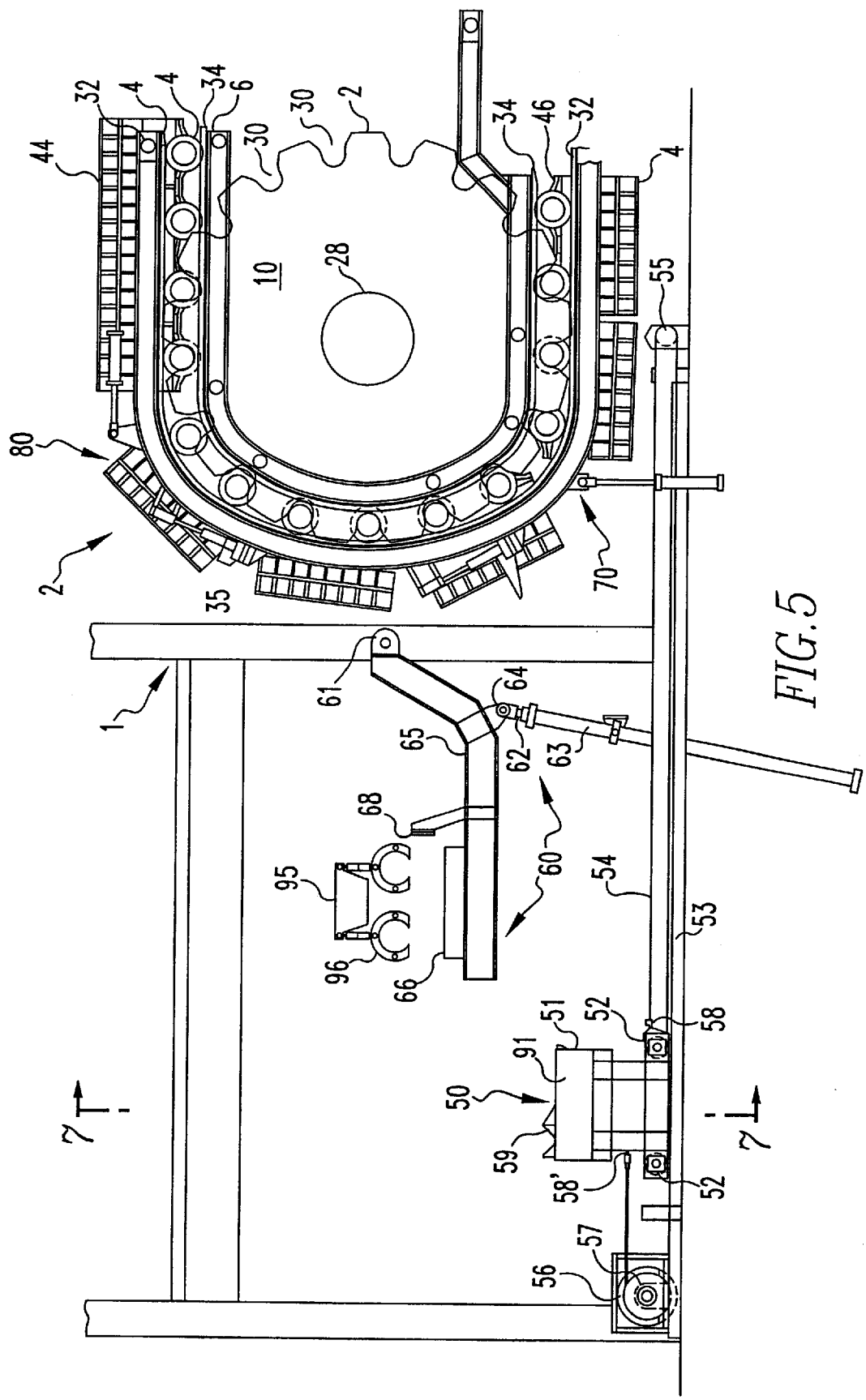
FIG. 5 is a side elevation view of the apparatus of the invention positioned adjacent to the drive sprocket means end of a traveling grate machine.

With reference specifically to FIG. 5, the apparatus for changing pallet cars on-the-fly according to the present invention includes four major elements, namely, a worn pallet car removal apparatus 50, a replacement pallet car loading apparatus 60, first hinged sections of guide rails 70 and second hinged sections of guide rails 80, the details of which will be described hereinafter.

The pallet removal apparatus 50 comprises a pallet shuttle car 51 having wheels 52 for riding on a pair of rails 53 for reciprocal movement from a remote location shown in FIG. 5 to a position adjacent to the intermediate curved portion 35 of the guide rails positioned beneath the lower or return strand 8 of the traveling grate machine. Reciprocal movement is accomplished by way of a wire rope 54 which is attached at point 58 to a forward end of the shuttle car 51 and looped around an idler pulley wheel 55. The wire rope 54 then is reversed, running to a driver sheave wheel 56 attached by a shaft to a reversible motor 57. The second end of the wire rope 54 is then attached to an opposite side 58' of the pallet car 51. In this manner, the pallet car 51 may be reciprocally moved by selective rotation of the motor 57 from a first remote position shown in FIG. 5 to a second pallet receiving position shown in FIGS. 8–12. The pallet shuttle car 51 has an upwardly projecting V-shaped support area 59 contoured to accept the pallet car after it is lowered and removed from the traveling grate machine, as will be explained in greater detail hereinafter. The front pair of pallet wheel rollers 47 rest in the depression formed by the V-shaped fixture 59 to cause the pallet car 4 to be stably retained by the pallet shuttle car 51 as it moves along the rails 53.

Figure 6:
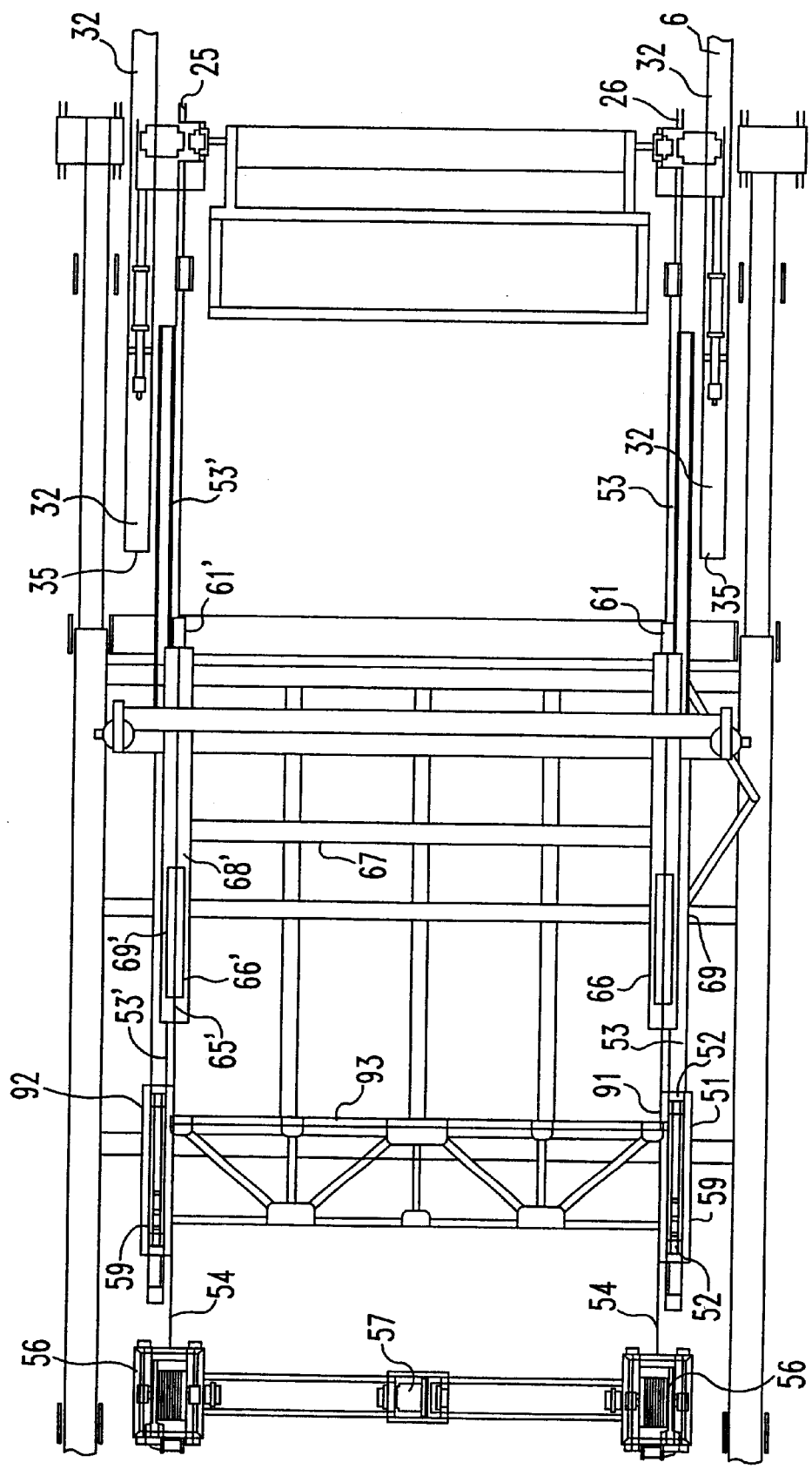
FIG. 6 is a plan view of the apparatus depicted in FIG. 5.
Figure 7:
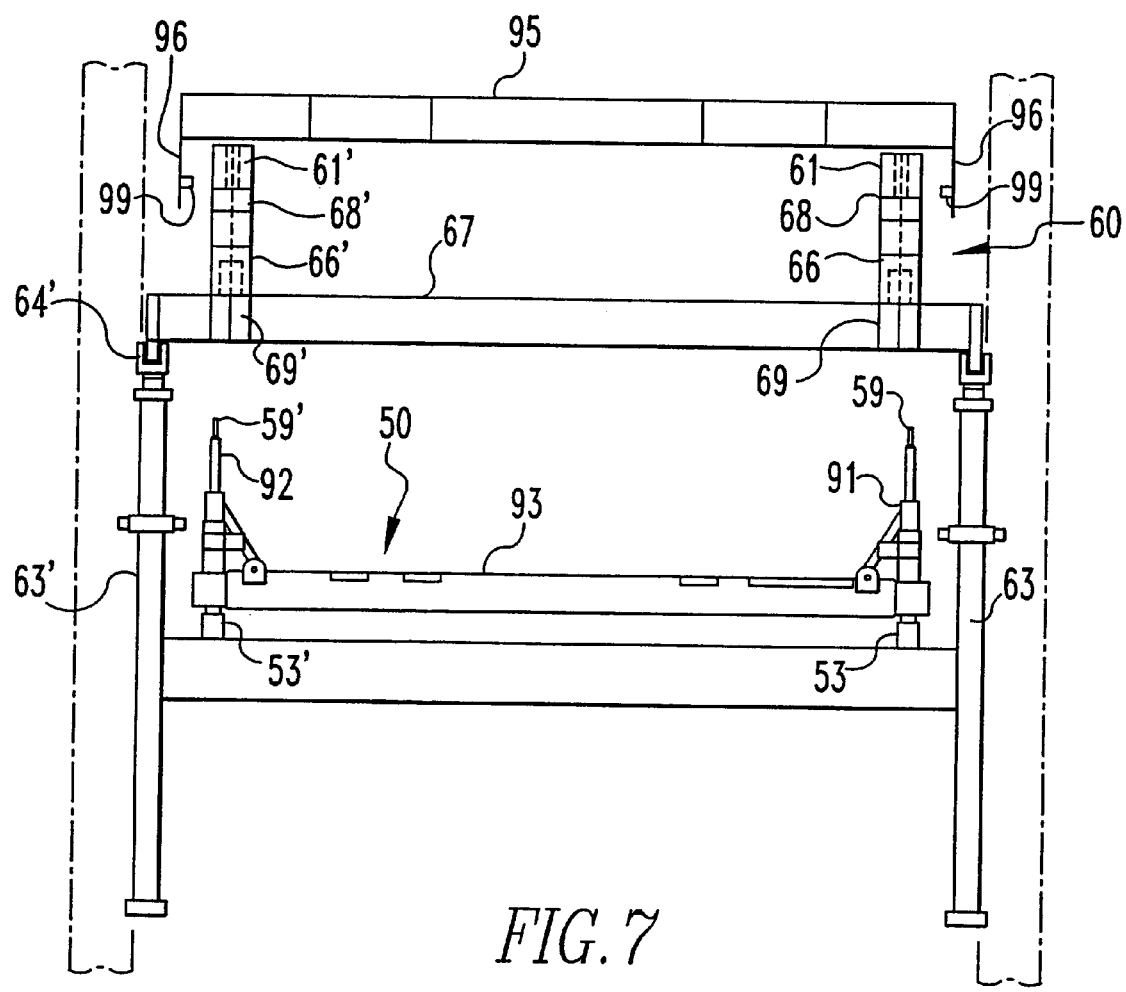
FIG. 7 is an end sectional view taken along section line VII—VII of FIG. 5.
Figure 8:
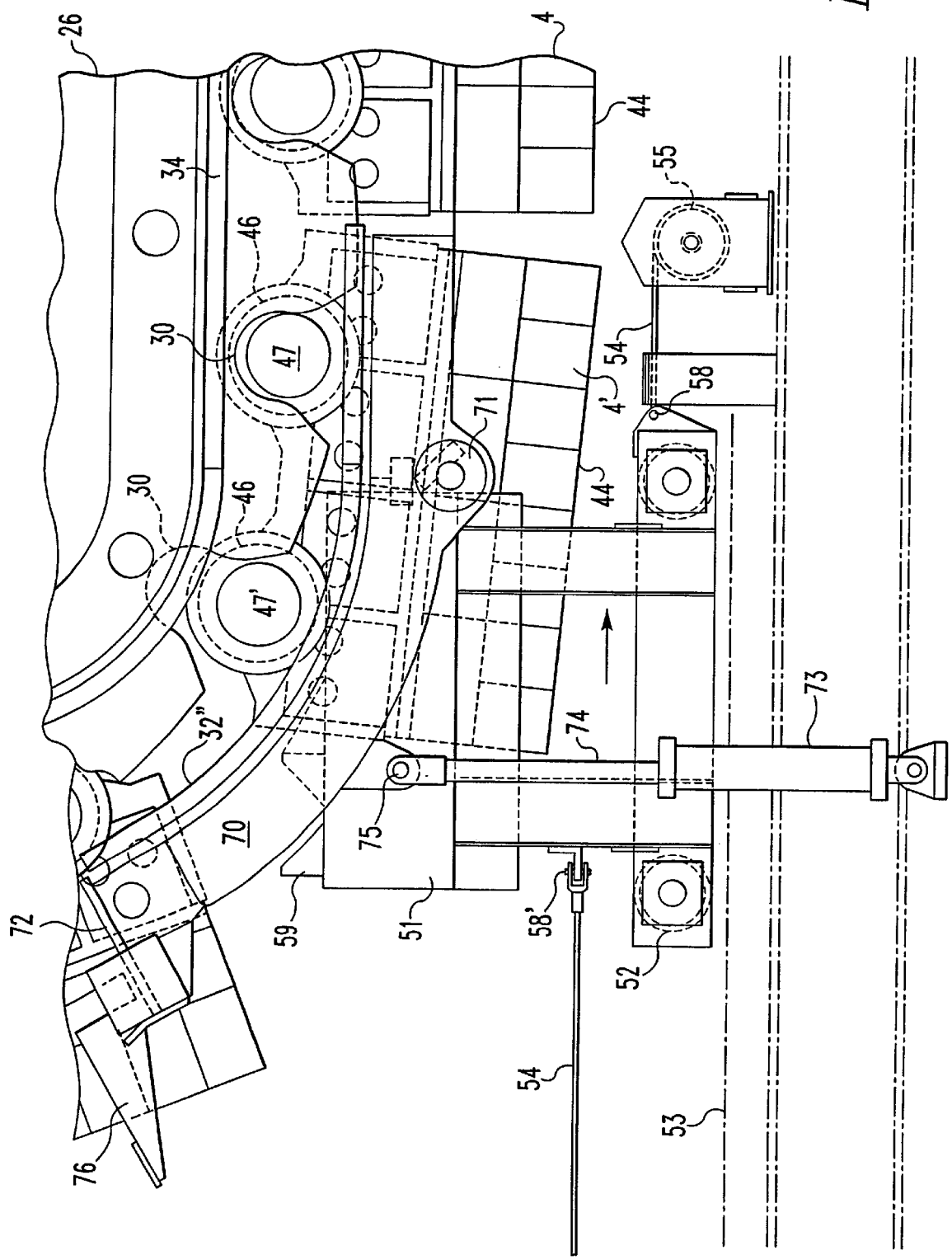
FIGS. 8–21 are sequential drawings showing a partial side elevation view of the apparatus of the present invention mounted adjacent to a traveling grate machine sequentially removing a pallet car from the traveling grate machine in FIGS. 8–14, and showing the replacement of a new pallet car in FIGS. 15–21.
Figure 9:
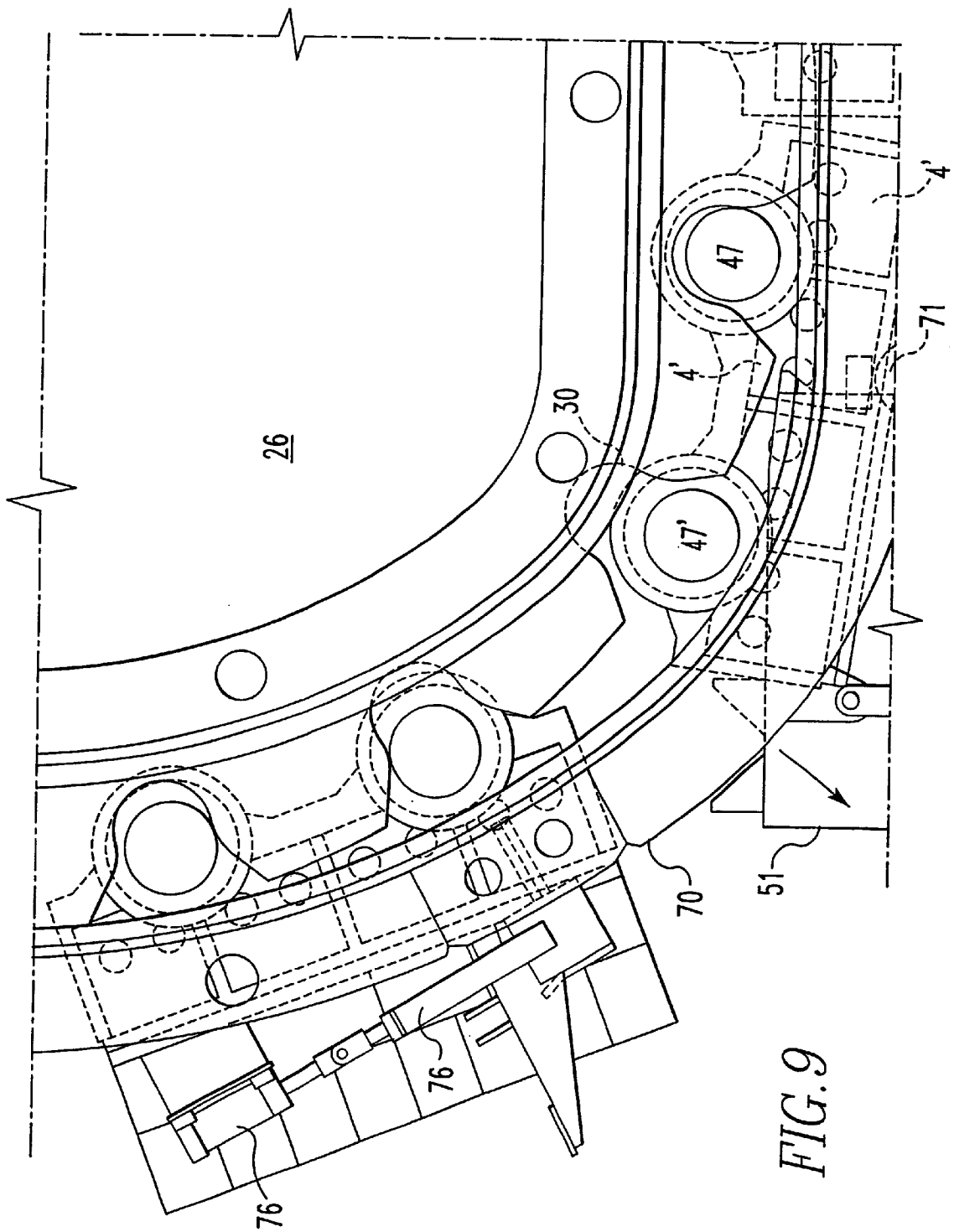

The pallet shuttle car 51 includes upstanding portions 91 and 92 which are joined by a cross member 93 to span the width between the guide rails 32, FIG. 6. The V-shaped fixture 59 is formed on top of each of the upstanding portions 91 and 92 of the shuttle car 51. The spaced-apart upstanding portions 91 and 92 of the shuttle car 51 have the aforesaid wheels 52 rotatably mounted at the bottom thereof for travel along the spaced-apart rails 53, 53', also shown in FIGS. 5 and 6.

The pallet loading apparatus 60 is attached at pivot connection 61 to the frame 1 of the traveling grate machine 2 to a generally L-shaped structural member 65 having two spaced-apart arms 69 and 69' interconnected by cross members 67 and pivotally attached at connections 61, 61' to the frame 1. The structural members 65, 65' are pivoted by way of activation of hydraulic cylinders 63, each having an extensible piston rod 62 which is attached at pivotal attachment point 64 to move the frame members 65, 65' about the pivotal connection points 61, 61' so that the pallet loading apparatus 60 may move a replacement pallet car into position for loading onto the traveling grate machine as previously described. Upwardly extending pad arms 68, 68' positioned adjacent to the cross member 67 along with pallet car pads 66, 66' accommodate a pallet car positioned thereon. The pads 66, 66' may be electro-magnetically actuated to retain the pallet car on the pallet frame members 65, 65' as the pallet loading apparatus 60 pivots upwardly. The pads 66 are configured to magnetically engage the lateral flanges 41' of the pallet car frame, FIG. 3. The arms 68 also assist in holding the pallet cars on the apparatus 60 as it pivots. A pallet removal bail apparatus 95 carrying chain-mounted horseshoe-shaped hooks 96 are used to lift a pallet car for placement on the pallet car pad 66 and for removing a worn pallet car from the shuttle car 51. The hooks 96 carry outwardly extending projections 99 which engage the wheels for lifting purposes, FIGS. 5, 7.

The method and apparatus for removal of a worn or otherwise damaged pallet car requiring maintenance and replacement designated 4' in drawings FIGS. 8–14 will now be described. As the pallet car 4' reaches the driven end of the return or bottom strand 8, adjacent to the intermediate curved end portion 35 of the guide rails, the first hinged sections 70 of the guide rails are activated. The first hinged sections 70 comprise curved or arcuate sections of outer guide rails 32" which extend from a pivotal hinge 71 to an end portion 72. A hydraulically actuated cylinder 73 actuates a rod 74 which is pivotally connected at pin 75 to the first hinged sections 70 of the guide rails. A pneumatic or hydraulic locking mechanism 76 securely locks the first hinged sections 70 with the frame structure of the traveling grate machine such that the curved sections of movable outer guide rails 32" are in smooth alignment with the permanently mounted outer guide rails 32 of the intermediate curved end portion 35. The pivotal hinge 71 is mounted at the end of the horizontally extending bottom strand 8. The first hinged sections of guide rails 70 extend outwardly from the hinge 71 a distance slightly in excess of the distance between the center lines of two wheel axles or shafts 45 of the pallet cars 4.

Figure 10:
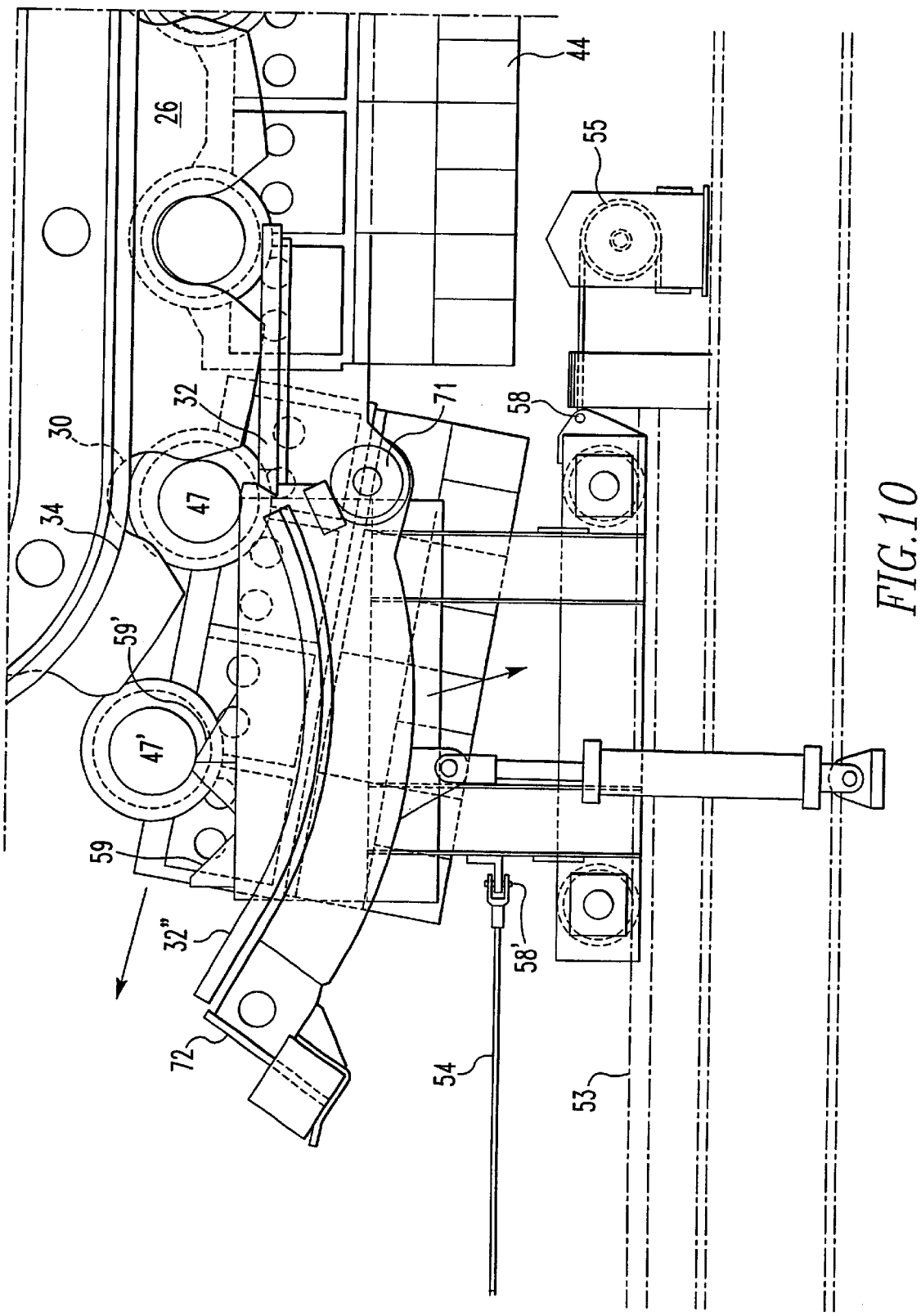
Figure 11:
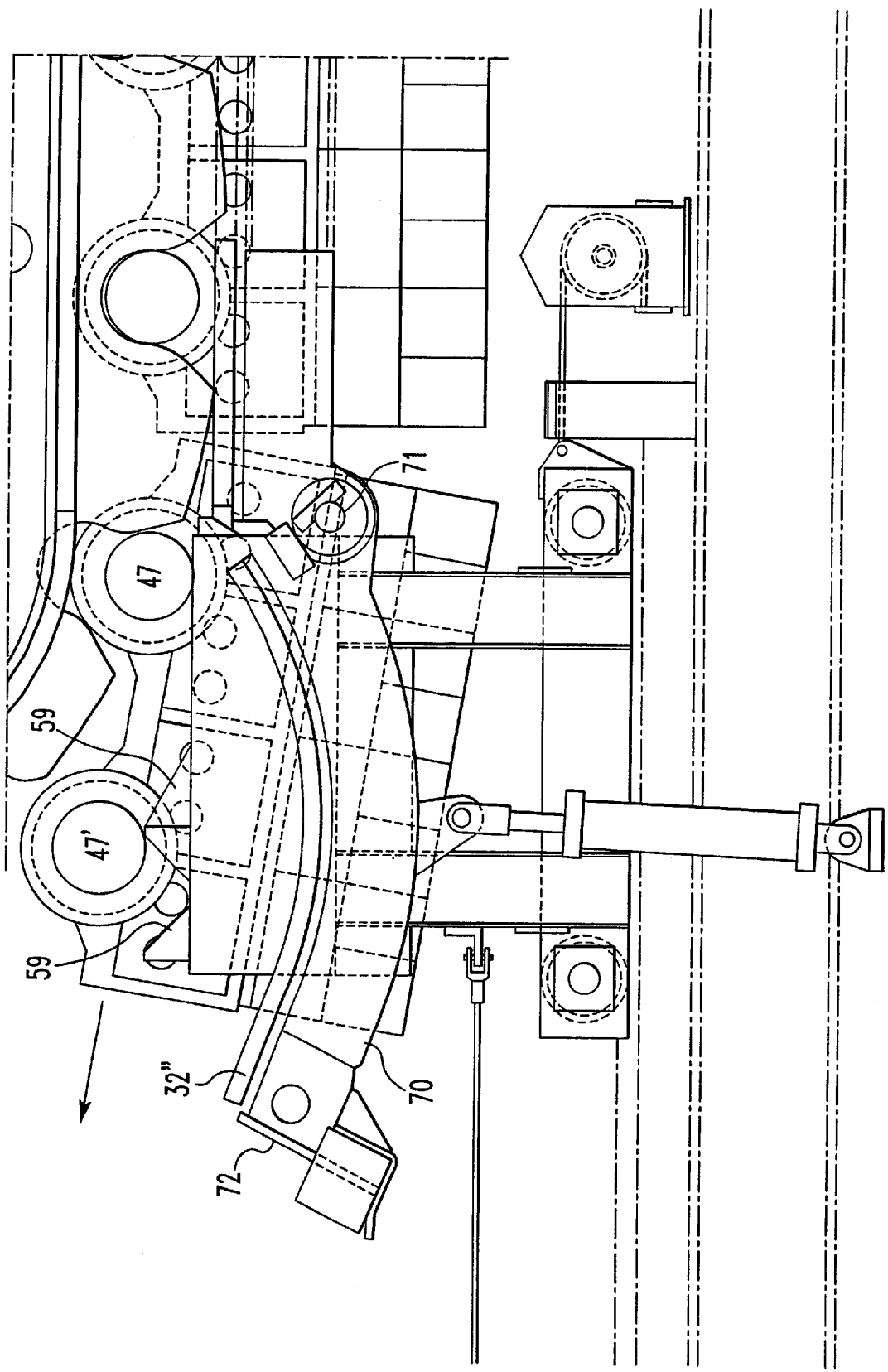
Figure 12:
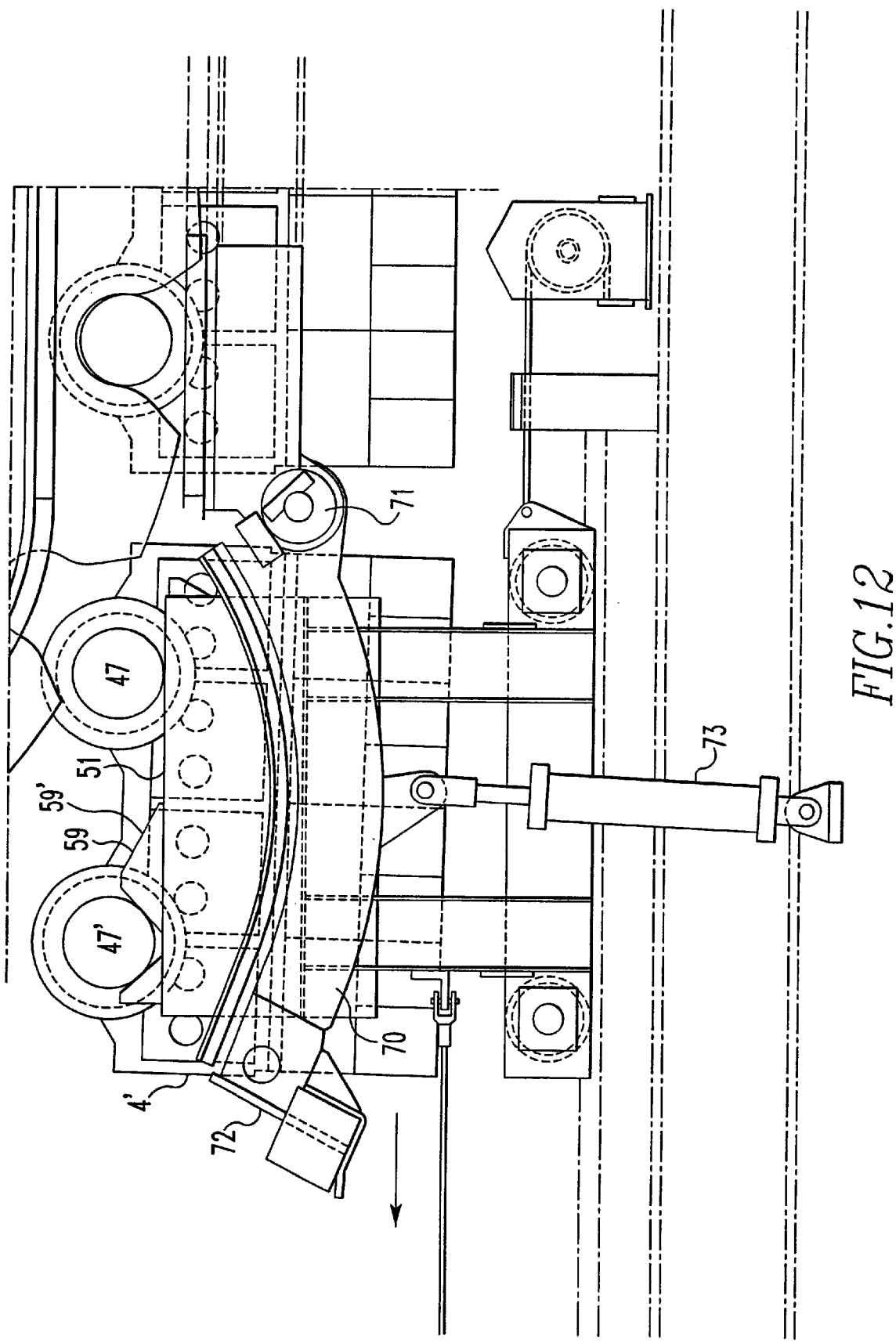
Figure 13:
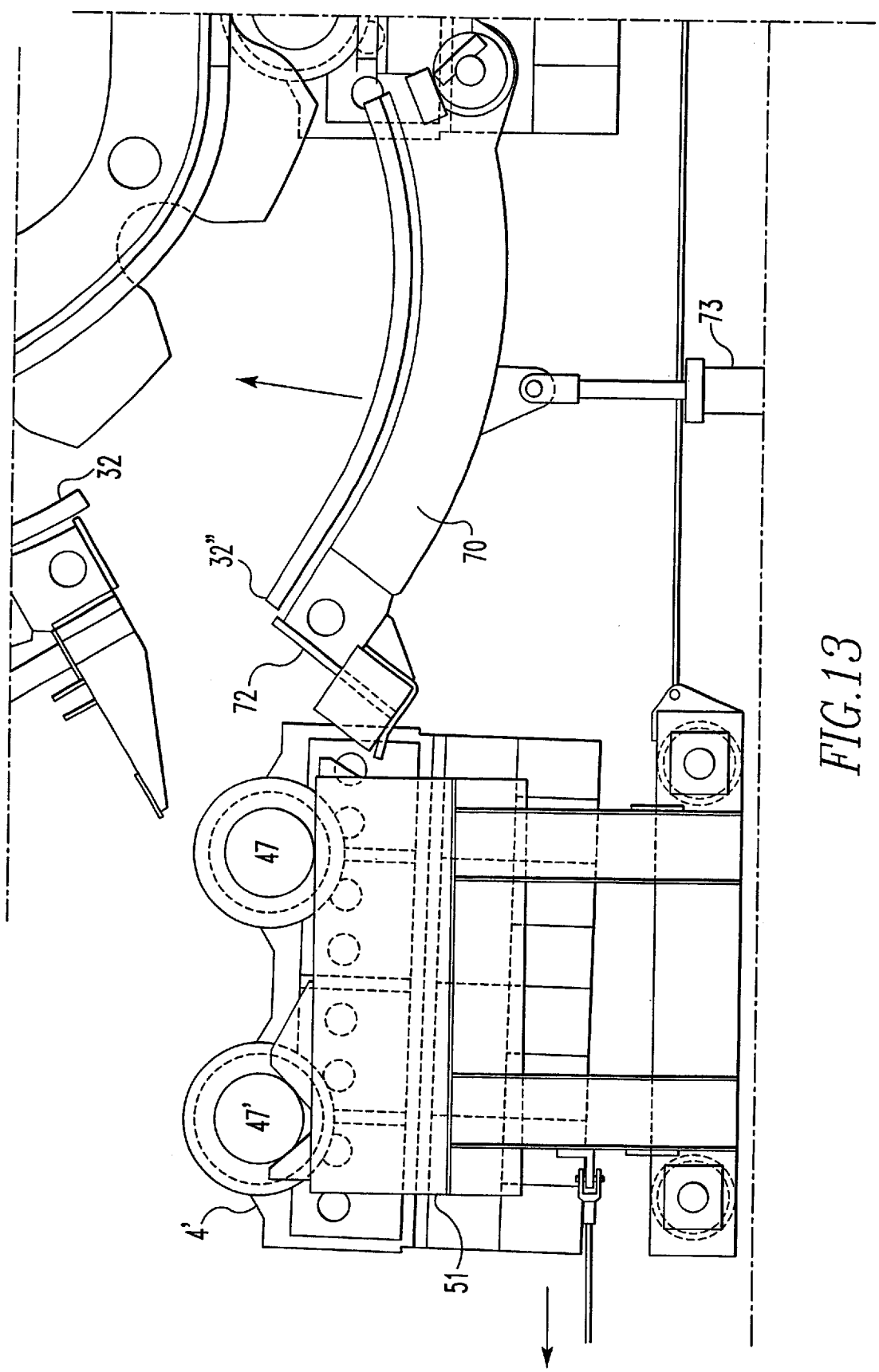
Figure 14:
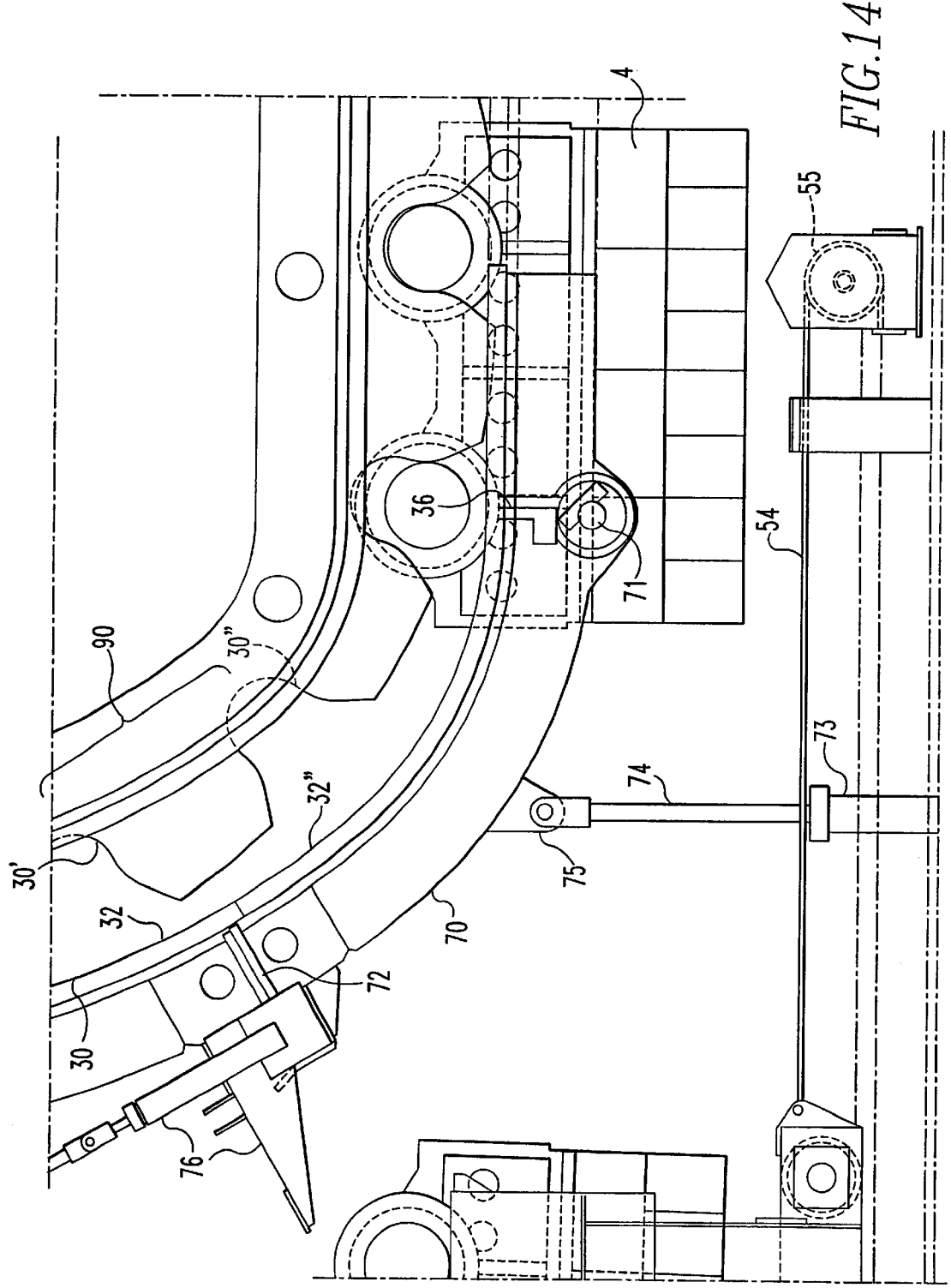

In order to remove the selected pallet car 4' from the traveling grate machine 2, the locking pins joining the first hinged sections 70 to the machine are removed by the hydraulic cylinder of the locking mechanism 76. The first hinged sections of guide rails 70 are pivoted about hinge 71 to lower the pallet car 4' onto the shuttle car 51, as shown sequentially in FIGS. 8–12. The shuttle car 51 is designed to accept the pallet car 4' being lowered and to remove the pallet car being replaced from the machine area. In the example shown in the drawings, the shuttle car 51 is reciprocally moved in and out of position by the wire rope 54 and winch mechanism 56 driven by motor 57. The rotating drive sprocket 26 causes the pallet car 4' to move and drop from the guide rails 32" onto the pallet car 51 by virtue of the moving sprocket teeth interacting on the pallet wheel axle rollers 47', see FIGS. 8–11, for example. The pallet car 4' is fully removed in FIG. 12 wherein the hydraulic cylinder 73 is in the fully retracted position and the roller 47' of the pallet car 4 is resting in the V-shaped fixture 59. As can be seen in FIG. 10, the fixture 59 has a sloped ramp-like surface 59' to permit the front pallet wheel rollers 47' to move up the sloped surface and, thence, fall securely in the V-shaped holding position shown in FIG. 12. In the position shown in FIG. 12, the removed pallet car 4' is then withdrawn by activation of the motor 57 which pulls the shuttle car 51 and pallet car in the direction of the arrow shown in the drawing to a remote location for maintenance and/or repair. The first hinged sections 70 are then raised by the hydraulic cylinder 73 as shown in FIG. 13 as the shuttle car 51 moves away from the area. In the fully raised position shown in FIG. 14, the first hinged sections of guide rail 70 are locked into position on the traveling grate machine by the locking mechanism 76. The position previously occupied by the now-removed pallet car 4' is shown as an empty position 90 depicted in FIG. 14, wherein the sprocket teeth 30' and 30" contain no pallet car rollers 47. Of course, it is understood that lower pivoted guide rails 70 must be fully raised and locked before the front wheel of the pallet car 4 trailing the removed car reaches the splice area of the outer guide rails 32. The splice area 36 of the outer guide rails 32 referred to above is located above the hinged connections 71, FIG. 14.

Figure 15:
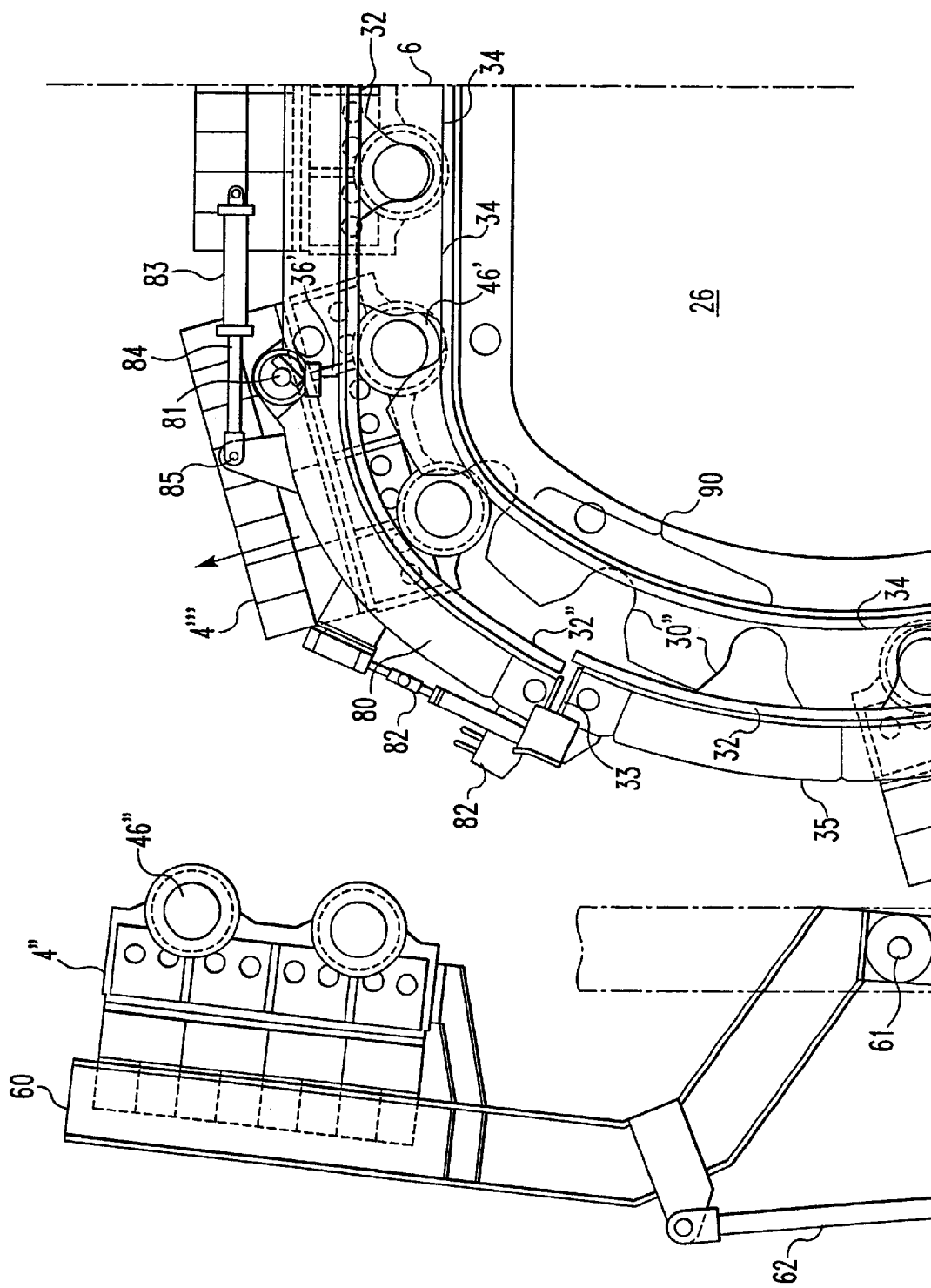

As shown in FIG. 15, when the leading wheels 46' of the pallet car 4''' leading the vacated area 90 on the sprocket enter the guide rails 32 past the rail splice location 36' above the hinge 81, the next phase of pallet car replacement begins. The replacement pallet car 4", previously loaded on the pallet loading apparatus 60, is pivoted about a connection 61 by a hydraulically actuated rod 62 to a point where the second hinged sections of guide rails 80 are pivotally moved outwardly while clearing the wheels and shafts 46" of the replacement pallet car 4".

Figure 16:
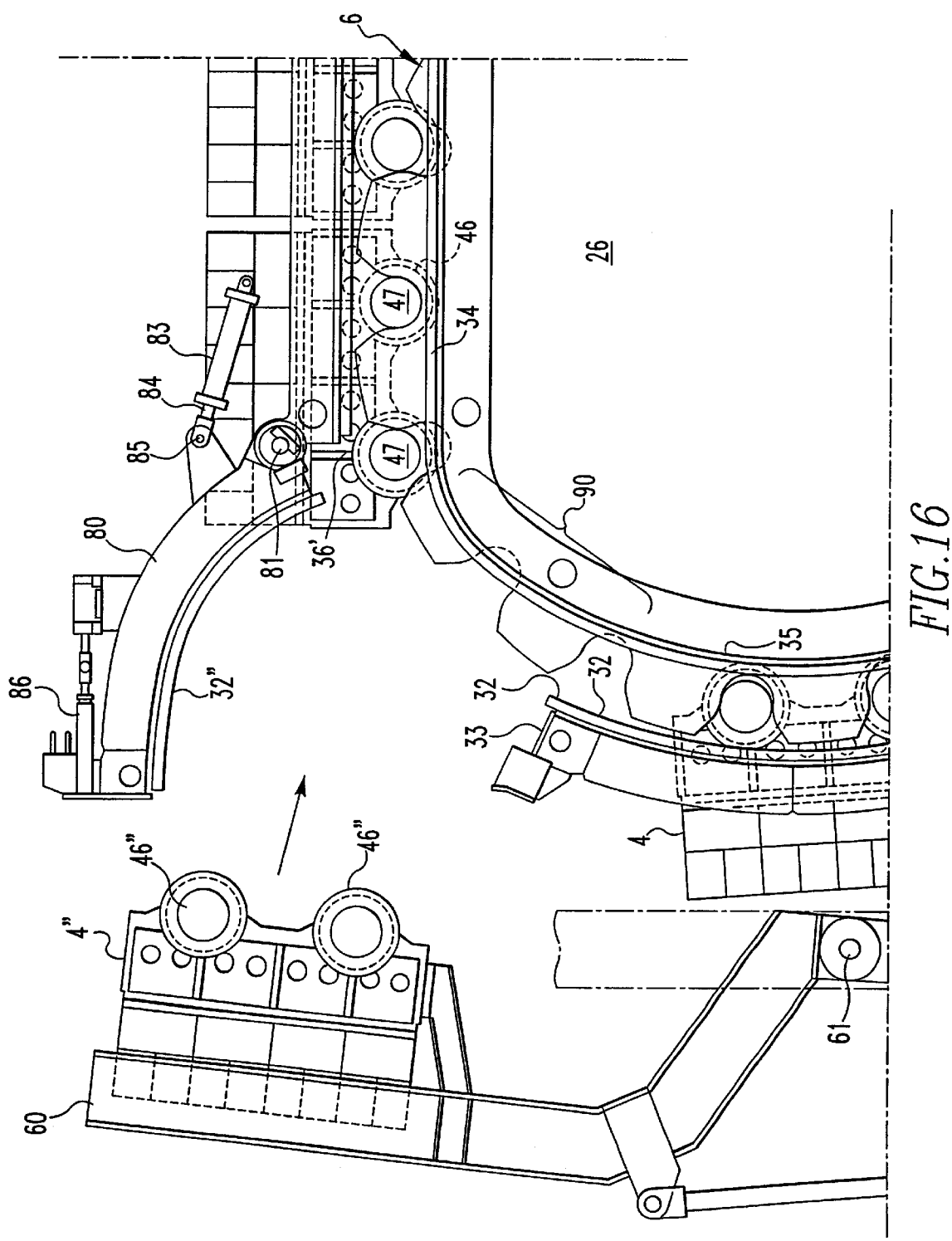

The second hinged sections of guide rails 80 operate much like the above-described first hinged sections of guide rails 70. The second hinged sections 80 are pivotally connected at hinge 81, which is positioned at the splice 36' between the intermediate curved portion of guide rails 35 and the flat or horizontally extending upper or top strand 6, see FIGS. 15–16. A locking mechanism 82 locks the second hinged sections 80 along with their arcuately extending outer guide rail segments 32" into locking engagement with the permanently mounted outer guide rails 32 at point 33 on the intermediate curved end portion 35 of the spaced-apart guide rails 32, 34, see FIGS. 15–16. As the empty region 90 of the sprockets 25 and 26 rotates upwardly toward the upper strand 6, the locking mechanism 82 releases the locking pin holding the second hinged sections 80 from the frame of the machine and a hydraulically actuated cylinder 83 having a movable reciprocating rod 84 pivotally attached to the second hinged sections 80 by a connection 85 moves in a retracting mode to swing the second hinged sections 80 upward and away from the traveling grate machine, as depicted in FIGS. 15 and 16. The lateral spacing between the second hinged sections 80 on either side of the traveling grate machine is greater than the width of the pallet car body 4" but less than the lateral length of the pallet wheels 46". Hence, the second hinged sections 80 must remain raised as the pallet loading apparatus 60 pivots the replacement pallet car 4" past the end of the second hinged sections 80 to avoid a collision between the hinged sections 80 and the wheel 46". As soon as the replacement pallet car 4" clears the second hinged sections 80, the replacement pallet car 4" may be pivoted into position.

Figure 17:
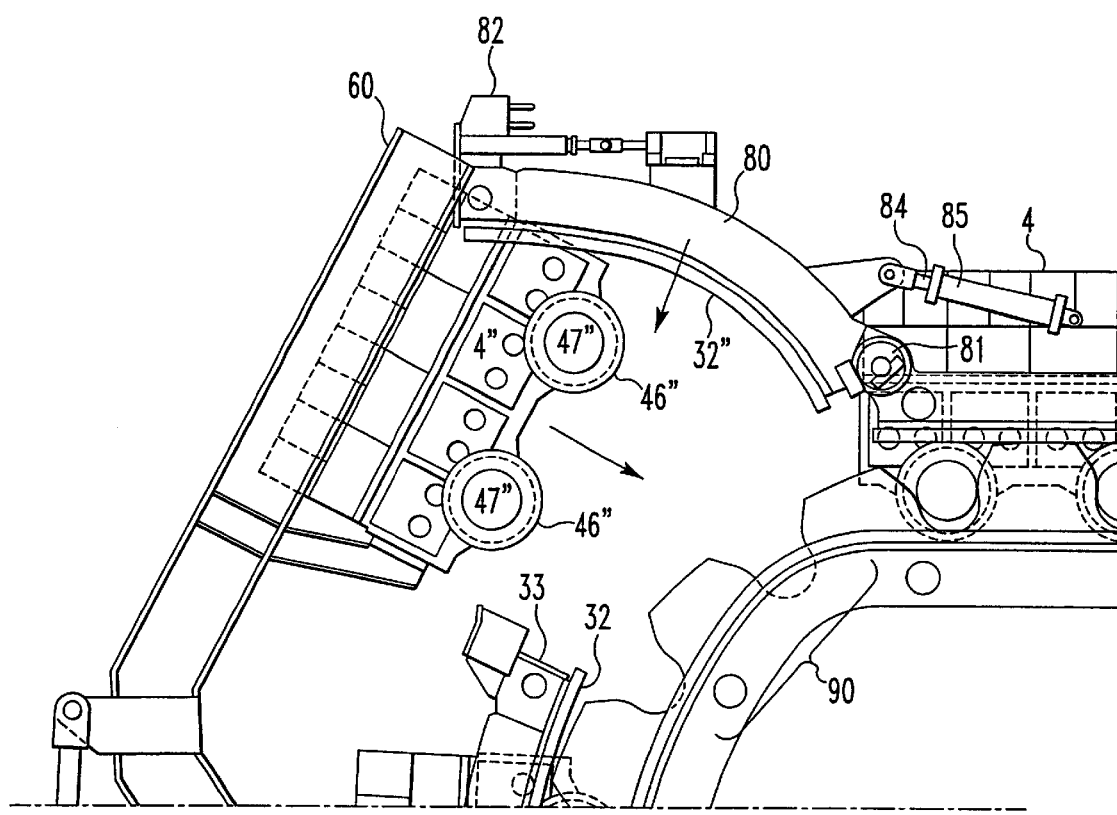
Figure 18:
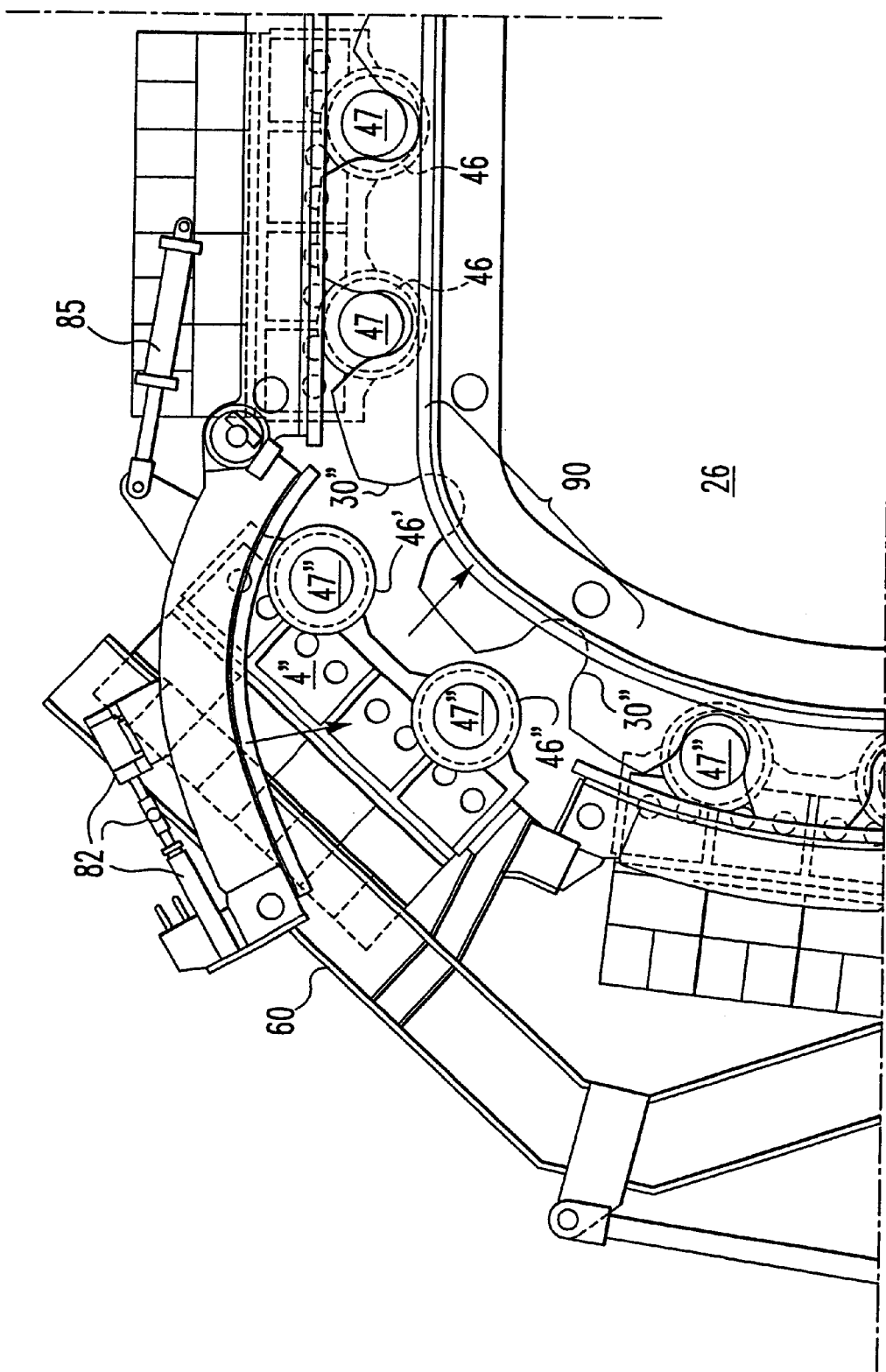
Figure 19:
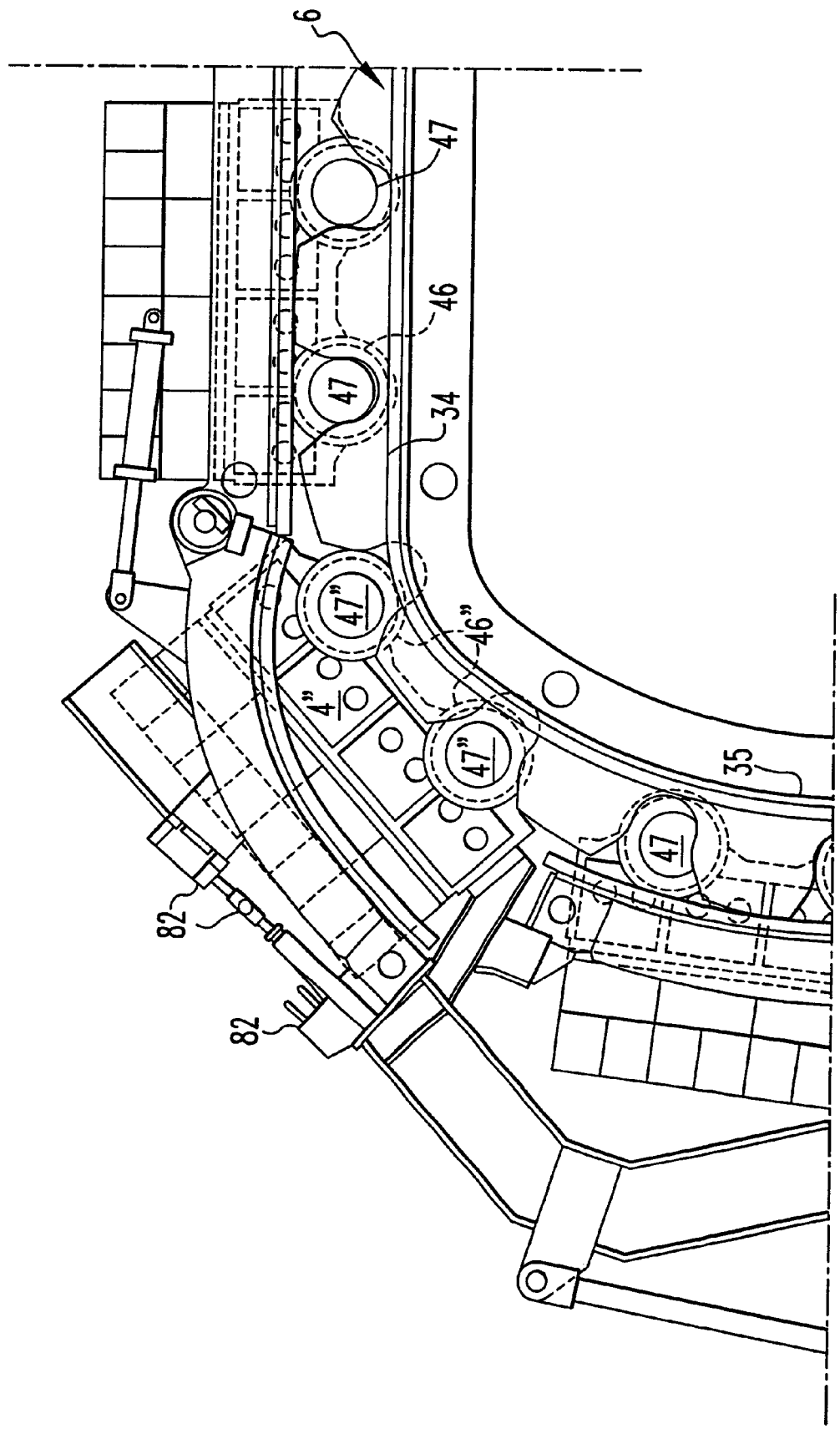
Figure 20:
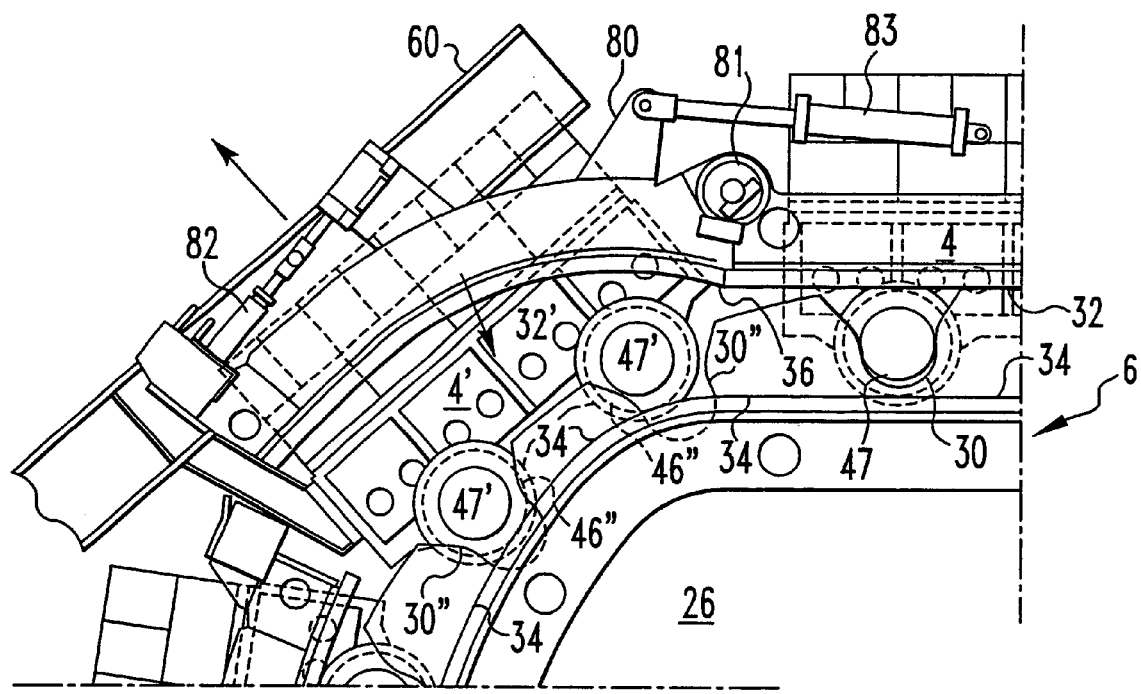

As soon as the replacement pallet wheel 46" passes the second hinged sections 80, the second hinged sections can be closed, as depicted in FIG. 17, since the spacing between the adjacent pair of second hinged sections 80 is greater than the lateral width of the pallet car 4" above the wheels thereof. The movement of the pallet loading apparatus 60 is synchronized with the rotation of the drive sprockets 25, 26 so that the replacement pallet car 4" enters the unoccupied space 90 between the sprocket teeth 30" without engaging the sprockets. FIGS. 17 and 18 show the sequential movement of the pallet loading apparatus 60 with the replacement pallet car 4" prior to entering the unoccupied sprocket space 90. FIGS. 19 and 20 depict the final movement of the pallet loading apparatus 60, wherein in FIG. 19, the apparatus 60 is decelerated to a stop so that the replacement pallet 4" wheels 46" contact the inner guide rails 34.

Just prior to the sprocket tooth 30" contacting a replacement pallet car roller 47", the replacement pallet car 4" is released from the pallet loading apparatus 60, and the pallet loading apparatus 60 is pivotally moved away from the traveling grate machine as shown in FIG. 20.

Figure 21:
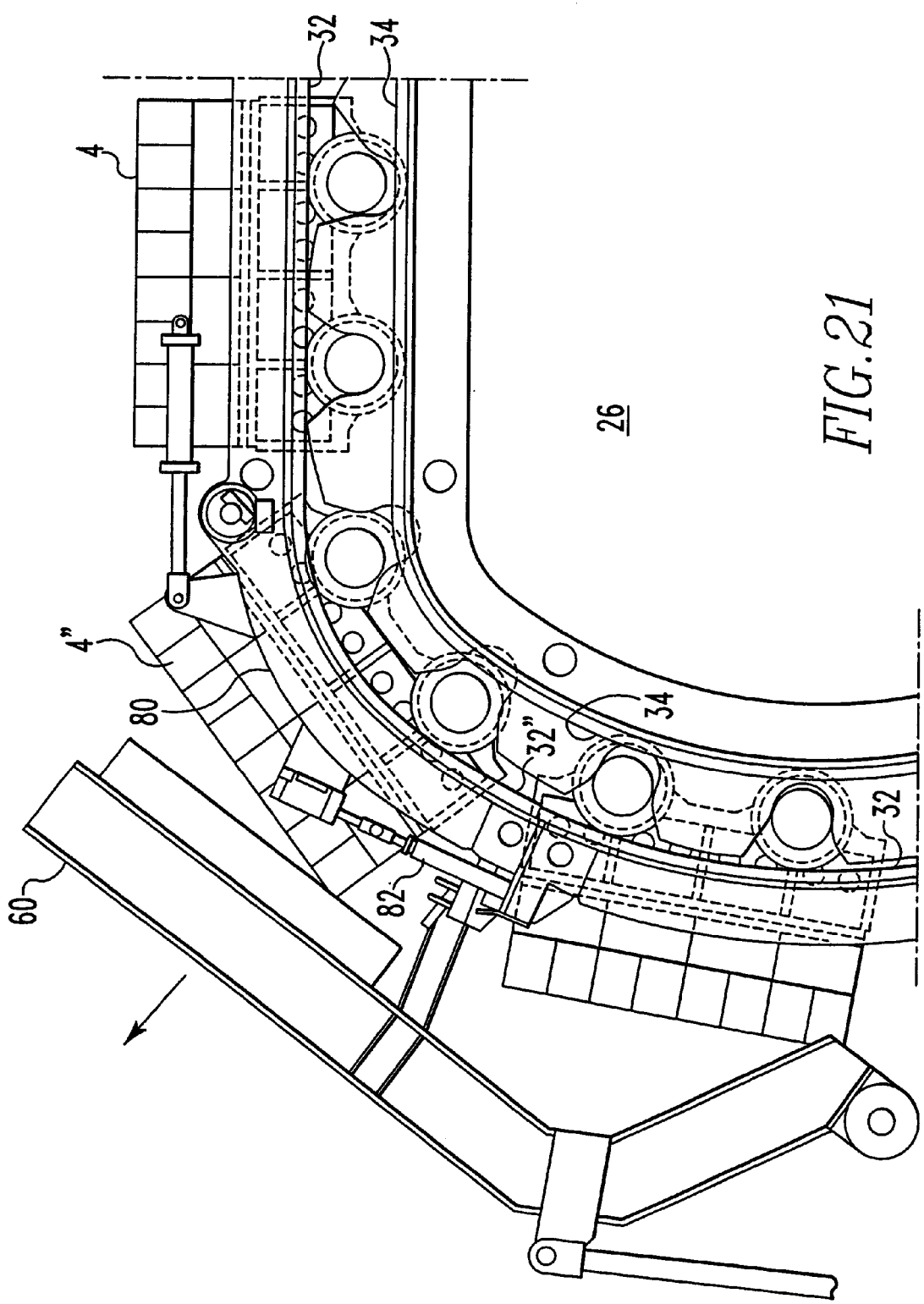

After the pallet loading apparatus 60 releases the replacement car 4", the pallet loading apparatus 60 moves away from the machine and simultaneously the second hinged sections of guide rails 80 move toward the traveling grate machine, as shown in FIG. 20. Finally, as depicted in FIG. 21, the second hinged sections 80 are in a fully closed position and the second hinged sections are fully locked within the structure by way of locking mechanism 82, thus completing the pallet replacement procedure "on-the-fly", see FIG. 21.

In summary, the sequence of operation according to the present invention consists of the following steps:

1. Just prior to the pallet car to be replaced 4' entering the guide rails, the pallet shuttle car 51 is moved into position, FIG. 8.
2. As soon as the rear wheels of the pallet car in front of the pallet car being replaced crosses the rail splice at the end of the pivot hinge 71, the lowering of the first guide rail on-the-fly begins, FIG. 9.
3. The first hinged sections of guide rails 70 lower the pallet car being replaced, designated 4', onto the pallet shuttle car 51 and it is pushed on top of the pallet shuttle car, FIG. 10.
4. The first hinged sections of guide rails 70 are lowered until the wheels of the pallet car being replaced 4' do not interfere when removed by the pallet shuttle car 51. Also, at this point the pallet car being replaced 4', which is being pushed by the drive sprockets 25 and 26, reaches the V-notch portion of the support fixture 59 of the pallet shuttle car 51, FIG. 11.
5. The leading roller 47' of the car being replaced falls into the V-notch of the shuttle car 51 and the shuttle car can then proceed from the loading area adjacent to the first on-the-fly of guide rails 70, FIG. 12.
6. As soon as the trailing wheel of the pallet car being replaced 4' clears the first on-the-fly of guide rails 70, the hinged sections of guide rails 70 are raised, FIG. 13.
7. The first on-the-fly of guide rails 70 must be fully raised before the front wheel of the pallet car 4 trailing the one being replaced 4' reaches the splice 36 at the hinge 71 of the first on-the-fly of guide rails, FIG. 14.
8. When the leading wheels of the pallet car 4''' leading the now-vacated area 90 on the sprockets 25, 26 enter the guide rails past the splice at the pivot 81 of the second on-the-fly of guide rails 80, the next phase pallet car replacement begins. The replacement pallet car 4" has been pivoted on the pallet loading apparatus 60 to a point where the second hinged sections of guide rails 80 can be rotated while clearing the wheels of the replacement pallet 4". At this point the second hinged sections 80 are pivoted away by first unlocking the mechanism 82 and then actuating the hydraulic cylinder 83 to retract the cylinder rod 84 which, in turn, moves the second hinged sections 80 pivotally about hinge 81 causing movement in the direction of the arrow in FIG. 15 away from the traveling grate machine.
9. As soon as the second hinged section of guide rails 80 clear the wheels 46" of the replacement pallet car 4", the replacement pallet may be pivoted into position, FIG. 16.
10. As soon as the wheels 46" of the replacement pallet car 4" pass the second hinged sections of guide rails 80, closure of the second hinged sections 80 begins. Closure is achieved by actuation of the hydraulic cylinder 85 causing the cylinder rod 84 to extend outwardly, causing the hinged sections 80 to pivot toward the traveling grate machine about the hinge 81, FIG. 17.
11. The rotation of the pallet loading apparatus 60 about pivot connection 61 is synchronized with the rotation of the sprockets 25 and 26 so that the rollers 47" of the replacement pallet car 4" enter the spaces 90 between the teeth 30" without engaging the sprocket. FIG. 18 shows the replacement pallet car 4" prior to entering the sprocket teeth openings 30".
12. The pallet loading apparatus 60 is then decelerated to a stop so that the pallet wheels 46" contact the inner guide rails 34, FIG. 19.
13. Just prior to the contacting of the sprocket tooth 30" with the roller elements 47" of the pallet car wheels 46", the replacement pallet car 4" is released from the pallet loading apparatus 60 and the loading apparatus is moved away from the traveling grate machine while the second hinged sections of guide rails 80 are closing, FIG. 20.

14. Shortly after the pallet loading apparatus 60 is reversed, the second hinged sections of guide rails 80 are closed, the locking pins of the locking mechanism 82 are set, and the replacement procedure has been completed, FIG. 21.

When other selected cars are chosen for removal, the above steps 1–14 are repeated. In this manner, pallet car replacement is made "on-the-fly" without interrupting production so as to improve quality and the economics of the operation since throughput is maximized.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. Apparatus for changing pallet cars on-the-fly in a traveling grate machine, the pallet cars having supporting wheels thereon and wherein the traveling grate machine has spaced-apart outer and inner guide rails at each side for guiding the wheels of the pallet cars along a top strand to a bottom strand and along intermediate, curved end portions joining the top and bottom strands, and wherein said traveling grate machine includes laterally spaced-apart drive sprocket means positioned at one of said intermediate curved end portions at each side thereof for engaging and driving rollers carried by the pallet cars and for causing movement of said pallet cars along the top and bottom strands of said machine, the apparatus for changing pallet cars comprising:

first hinged sections of outer guide rails located at the drive sprocket means adjacent to the bottom strand;

means for pivotally moving the first hinged sections of outer guide rails from a locked position to an open position, whereby in an open position a selected first pallet car may be removed from the drive sprocket means and outer guide rail as the drive sprocket means is moving;

second hinged sections of outer guide rails located at the drive sprocket means adjacent to the upper strand; and means for pivotally moving the second hinged sections of outer guide rails from a locked position to an open position whereby, in an open position, a replacement pallet car may be inserted on said drive sprocket means and against said inner guide rails in a position previously occupied by said selected first pallet car as said drive sprocket is moving.

2. The pallet car changing apparatus according to claim 1 including a pallet car removal means comprising a movable shuttle car for receiving and supporting said selected first pallet car from the first hinged sections of outer guide rails and for transporting the pallet car to a remote location.

3. The apparatus according to claim 1 including a pallet car insertion means comprising a structural frame pivotally mounted adjacent to the drive sprocket means for supporting and lifting the replacement pallet car into a position whereby said replacement pallet car may be inserted on said drive sprocket means as said structural frame pivots to an uppermost position.

4. The apparatus of claim 3 wherein the pallet car insertion means includes means for electro-magnetically holding the replacement pallet car thereto as said structural frame pivots to an uppermost position and for selectively releasing the electro-magnetic hold when the replacement pallet car is inserted on the drive sprocket means.

5. The apparatus of claim 1 including means for selectively locking and unlocking the outer guide rails at said first and second hinged sections of outer guide rails when said hinged sections are in the locked positions and unlocked positions.

6. A method for changing pallet cars comprising the steps of:

providing a first hinged section of outer guide rails loaded at the drive sprocket means adjacent to the bottom strand of the traveling grate machine;

opening the first hinged section of guide rails;

removing a first selected pallet car positioned at the first hinged section as the drive sprocket means rotates to provide an open space between a pair of adjacent pallet cars;

closing said first hinged section of guide rails after said pallet car has been removed to permit an adjacent trailing car to ride therealong;

providing a second hinged section of outer guide rails spaced from said first hinged section located at the drive sprocket means adjacent the upper strand of the machine;

rotating the drive sprocket means to index the open space formerly occupied by the removed pallet car to a position adjacent said second hinged section of guide rails;

opening the second hinged section;

inserting a replacement pallet car into the space formerly occupied by the removed car; and closing the second hinged section of outer guide rails, whereby the pallet car replacement is accomplished without halting movement of the drive sprocket means.

* * * * *

UNITED STATES PATENT AND TRADEMARK OFFICE
CERTIFICATE OF CORRECTION

PATENT NO.   : 6,523,673 B1
DATED        : February 25, 2003
INVENTOR(S)  : Edward A. Fenton, Jr.

It is certified that error appears in the above-identified patent and that said Letters Patent is hereby corrected as shown below:

<u>Column 1,</u>
Line 23, "for example." should read -- for example, --.

<u>Column 7,</u>
Line 27, "hinged. sections 80" should read -- hinged sections 80 --.

Signed and Sealed this

Nineteenth Day of August, 2003

JAMES E. ROGAN
*Director of the United States Patent and Trademark Office*